United States Patent
Geens et al.

(10) Patent No.: US 11,874,517 B2
(45) Date of Patent: Jan. 16, 2024

(54) TELECOMMUNICATIONS TERMINAL WITH STUB CABLE

(71) Applicant: COMMSCOPE TECHNOLOGIES LLC, Hickory, NC (US)

(72) Inventors: Johan Geens, Bunsbeek (BE); Philippe Coenegracht, Hasselt (BE); Pieter Doultremont, Kermt-Hasselt (BE)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 235 days.

(21) Appl. No.: 17/286,749

(22) PCT Filed: Oct. 18, 2019

(86) PCT No.: PCT/US2019/056951
§ 371 (c)(1),
(2) Date: Apr. 19, 2021

(87) PCT Pub. No.: WO2020/081942
PCT Pub. Date: Apr. 23, 2020

(65) Prior Publication Data
US 2021/0373271 A1  Dec. 2, 2021

Related U.S. Application Data

(60) Provisional application No. 62/747,810, filed on Oct. 19, 2018.

(51) Int. Cl.
*G02B 6/00* (2006.01)
*G02B 6/44* (2006.01)
*G02B 6/38* (2006.01)

(52) U.S. Cl.
CPC ......... *G02B 6/4472* (2013.01); *G02B 6/3825* (2013.01); *G02B 6/3885* (2013.01); *G02B 6/3894* (2013.01); *G02B 6/3897* (2013.01)

(58) Field of Classification Search
CPC .. G02B 6/4472; G02B 6/3825; G02B 6/3885; G02B 6/3894; G02B 6/3897; G02B 6/00
See application file for complete search history.

(56) References Cited

U.S. PATENT DOCUMENTS 5,378,174 A   1/1995  Brownlie et al.
6,915,056 B2  7/2005  Wentworth et al.
(Continued)

FOREIGN PATENT DOCUMENTS

EP   1 349 249 A1   10/2003
WO   00/67052 A1    11/2000
(Continued)

OTHER PUBLICATIONS

International Search Report and Written Opinion of the International Searching Authority for International Patent Application No. PCT/US2019/056951 dated Feb. 11, 2020, 10 pages.
(Continued)

*Primary Examiner* — Jennifer Doan
(74) *Attorney, Agent, or Firm* — Merchant & Gould P.C.

(57) ABSTRACT

Aspects of the present disclosure relate to a telecommunications terminal including fiber optic adapters mounted to or integrated with a side wall of a housing of the telecommunications terminal. The telecommunications terminal also includes an output stub cable having a free end located outside the housing. The fiber optic adapters include ruggedized first demateable fiber optic connection locations accessible from outside the housing and the free end of the stub cable includes a second demateable fiber optic connection location accessible from outside the housing.

16 Claims, 17 Drawing Sheets

(56) References Cited

U.S. PATENT DOCUMENTS

| | | |
|---|---|---|
| 7,013,074 B2 | 3/2006 | Battey et al. |
| 7,264,402 B2 | 9/2007 | Theuerkorn et al. |
| 7,512,304 B2 | 3/2009 | Gronvall et al. |
| 7,558,458 B2 | 3/2009 | Gronvall et al. |
| 7,539,387 B2 | 5/2009 | Mertesdorf et al. |
| 7,805,044 B2 | 9/2010 | Reagan et al. |
| 7,959,361 B2 | 6/2011 | Lu et al. |
| 8,213,760 B2 | 7/2012 | Rudenick et al. |
| 8,414,196 B2 | 4/2013 | Lu et al. |
| 8,457,464 B2 | 6/2013 | O'Connor |
| 8,837,940 B2 | 9/2014 | Smith et al. |
| 9,348,096 B2 | 5/2016 | Kmit et al. |
| 10,031,307 B2 * | 7/2018 | Claessens ............ G02B 6/4454 |
| 2014/0219621 A1 | 8/2014 | Barette, Jr. et al. |
| 2014/0219622 A1 * | 8/2014 | Coan ................... G02B 6/4471 29/428 |
| 2014/0241670 A1 | 8/2014 | Barette, Jr. et al. |
| 2015/0219856 A1 | 8/2015 | Wang |
| 2015/0268434 A1 | 9/2015 | Barnette, Jr. et al. |

FOREIGN PATENT DOCUMENTS

| | | |
|---|---|---|
| WO | 2014/123940 A1 | 8/2014 |
| WO | 2014/167447 A1 | 10/2014 |
| WO | 2014/197894 A1 | 12/2014 |
| WO | 2015/193384 A2 | 12/2015 |
| WO | 2017/202797 A1 | 11/2017 |
| WO | 2018/149913 A1 | 8/2018 |
| WO | 2018/149917 A1 | 8/2018 |
| WO | 2018/197410 A1 | 11/2018 |

OTHER PUBLICATIONS

Extended European Search Report for European Patent Application No. 19874215.7 dated Jun. 13, 2022, 8 pages.

* cited by examiner

TELECOMMUNICATIONS TERMINAL WITH STUB CABLE

CROSS-REFERENCE TO RELATED APPLICATION

This application is a National Stage Application of PCT/US2019/056951, filed on Oct. 18, 2019, which claims the benefit of U.S. Patent Application Ser. No. 62/747,810, filed on Oct. 19, 2018, the disclosures of which are incorporated herein by reference in their entireties. To the extent appropriate, a claim of priority is made to each of the above disclosed applications.

TECHNICAL FIELD

The present disclosure relates generally to optical fiber communication systems. More particularly, the present disclosure relates to enclosures used in optical fiber communication systems.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber connectors and fiber optic enclosures are an important part of most fiber optic communication systems. Fiber optic connectors allow two optical fibers to be quickly optically connected without requiring a splice. Fiber optic connectors can be used to optically interconnect two lengths of optical fiber. Fiber optic connectors can also be used to interconnect lengths of optical fiber to passive and active equipment. Fiber optic enclosures are incorporated into fiber optic networks to facilitate providing access to optical fibers of fiber optic network cables. Fiber optic enclosures often house components such as splice trays, passive optical splitters, fiber optic adapters, fiber optic connectors, connector storage regions, connection fields/panels, connectorized pigtails, wavelength divisional multi-plexers and other components.

A typical fiber optic connector includes a ferrule assembly supported at a distal end of a connector body. A spring is used to bias the ferrule assembly in a distal direction relative to the connector body. The ferrule functions to support an end portion of at least one optical fiber (in the case of a multi-fiber ferrule, the ends of multiple fibers are supported). The ferrule has a distal end face at which a polished end of the optical fiber is located. When two fiber optic connectors are interconnected, the distal end faces of the ferrules abut one another and the ferrules are forced proximally relative to their respective connector bodies against the bias of their respective springs. With the fiber optic connectors connected, their respective optical fibers are coaxially aligned such that the end faces of the optical fibers directly oppose one another. In this way, an optical signal can be transmitted from optical fiber to optical fiber through the aligned end faces of the optical fibers. For many fiber optic connector styles, alignment between two fiber optic connectors is provided through the use of an intermediate fiber optic adapter. The fiber optic adapter can include an alignment sleeve for receiving and co-axially aligning the ferrules of the two mated connectors. The alignment sleeve can take the form of a cylindrical split sleeve having a resilient/elastic construction. Example fiber optic connectors are disclosed at U.S. Pat. No. 8,837,940. Other connector systems may have male and female connectors that mate to provide fiber alignment. For example, MPO connectors include a mating pin and socket arrangement for providing ferrule alignment and use an adapter for mechanically holding the mated connectors together. Still other connectors can be ferruleless and can utilize structures such as v-grooves, rigid bores or other structures for providing alignment of bare fibers corresponding to the fiber optic connectors.

Many fiber optic enclosures are designed to be installed in outside environments and are environmentally sealed. Example fiber optic enclosures for use in outside environments are disclosed by U.S. Pat. Nos. 7,512,304; 7,558,458; 8,213,760; 7,805,044; 7,539,387; and 7,013,074. A typical fiber optic enclosure of this type includes at least one sealed cable port for routing a fiber optic network cable into the enclosure. This type of enclosure can also include sealed connector ports for interfacing with connectorized drop cables. Optical fibers of the fiber optic network cable routed into the enclosure are often accessed within the enclosure and spliced to another cable such as a drop cable, directly connectorized or spliced to connectorized pigtails. When the fibers are connectorized, the connectorized ends can be plugged into inner ends of fiber optic adapters incorporated into the sealed connector ports. The fiber optic adapters can include alignment sleeves and are installed at the sealed connector ports at the time the enclosure is initially assembled. In the field, outer ends of the fiber optic adapters can be used to receive ruggedized fiber optic connectors corresponding to drop cables to provide optical connections between the drop cables and optical fibers of the fiber optic network cable without having to access an interior of the enclosure.

SUMMARY

One aspect of the present disclosure relates to a telecommunications enclosure defining an interior. In a preferred example, the enclosure includes a housing suitable for outdoor environmental use that is preferably sealed. The housing can include a first side. The telecommunications enclosure also includes a plurality of fiber optic adapters mounted at or integrated with the first side of the housing. The fiber optic adapters have ruggedized outer ports that are fixed relative to the first side of the housing and are adapted for receiving ruggedized fiber optic connectors. In certain examples, the ruggedized outer ports can be closed and sealed by plugs or caps when no ruggedized fiber optic connectors are secured within the outer ports. The ruggedized outer ports are accessible from outside the housing at the first side of housing. The telecommunications enclosure also includes a fiber optic cable that enters the interior of the housing at a cable entrance/exit location that is not located at the first side of the housing. The fiber optic cable can include only one optical fiber, or can include a plurality of optical fibers. The fiber optic cable is routed along a path that extends along an exterior of the housing from the cable entrance/exit location to the first side. In one example, the fiber optic cable is an input fiber optic cable. In another example, the fiber optic cable is a stub cable. In still another example, the telecommunications enclosure includes an input fiber optic cable and at least one stub cable that enter the interior of the housing at the entrance/exit location. In certain examples, the telecommunications enclosure can include a fiber optic indexing architecture. In certain examples, the telecommunications enclosure can include one or more passive, fiber optic power splitters (i.e., structures that split the optical power of signals carried by optical fibers) or wavelength division multiplexing devices (i.e., structures that split/separate optical signals based on wavelength). In certain examples, the telecommunications enclosure can include an input optical cable having optical fibers optically coupled to the fiber optic adapters and also optically connected to one or more stub fiber optic cables. In certain examples, the optical connections can include optical connections passing through a passive optical power splitter; optical connections passing through a wavelength division multiplexing device; or optical connections that are not optically power split or divided based on wavelength.

Another aspect of the present disclosure relates to a telecommunications enclosure including a housing defining an interior. The housing includes a first side. The telecommunications enclosure also includes a plurality of fiber optic adapters positioned at the first side of the housing. Fiber optic adapters have ruggedized ports fixed relative to the first side of the housing. The ruggedized ports are accessible from outside the housing at the first side of the housing. The telecommunications enclosure further includes a fiber optic cable that enters the interior of the housing at a cable entrance/exit location that is not located at the first side. The fiber optic cable is routed along a path that extends along an exterior of the housing from the cable entrance/exit location to the first side. In certain examples, the path can include one or more channels defined by an exterior of the housing. In certain examples, the path can include one or more curved, bend radius limiters at the exterior of the housing about which the fiber optic cable extends. In certain examples, the fiber optic cable can be an input fiber optic cable having one or more optical fibers, or an output stub cable having one or more optical fibers.

It will be appreciated that enclosures in accordance with the principles of the present disclosure can include ruggedized fiber optic adapters and/or ruggedized fiber optic connectors. The ruggedized fiber optic connectors can include male fiber optic connectors and female fiber optic connectors. It will be appreciated that the term "ruggedized" can be used interchangeably with the word "hardened." It will be appreciated that the terms "ruggedized" or "hardened" mean that the fiber optic connector or fiber optic adapter are generally designed for outside environmental use and have constructions that are more robust than conventional indoor fiber optic connectors and indoor fiber optic adapters such as standard SC fiber optic connectors and SC fiber optic adapters or LC fiber optic connectors and LC fiber optic adapters. In certain examples, ruggedized fiber optic adapters and ruggedized fiber optic connectors can include environmental seals. In certain examples, ruggedized fiber optic connectors can include relatively robust fastening elements for securing the ruggedized fiber optic connectors within fiber optic adapters or mating ruggedized fiber optic connectors. For example relatively robust fasteners can include twist-to-lock fasteners such as internally or externally threaded fasteners, and/or bayonet style fasteners.

Another aspect of the present disclosure relates to a telecommunications enclosure including a housing defining an interior. The housing includes a first side. The telecommunications enclosure also includes a plurality of fiber optic adapters positioned at the first side of the housing. The fiber optic adapters have ruggedized outer ports fixed relative to the first side of the housing. The ruggedized outer ports of the fiber optic adapters are accessible from outside the housing at the first side of the housing. The telecommunications enclosure further includes an output stub cable that enters the housing at a location other than the first side. The output stub cable has a free end positioned outside the housing that includes a ruggedized de-mateable optical connection location. In certain examples, the free end optionally is accessible adjacent the first side of the housing. In certain examples, a stub cable optionally has a length less than or equal to one meter. In certain examples, the stub cable optionally is routed along a path extending along an exterior of the housing from the cable entrance/exit location to the first side. In certain examples, the path optionally includes a channel for receiving the stub cable. In certain examples, the path optionally includes a cable bend radius limiter located at a corner of the housing.

A further aspect of the present disclosure relates to a telecommunications enclosure including a housing defining an interior. The housing includes a first side. The telecommunications enclosure also includes a plurality of fiber optic adapters positioned at the first side of the housing. The fiber optic adapters have ruggedized outer ports fixed relative to the first side of the housing. The ruggedized outer ports are accessible from outside the housing at the first side of the housing. The telecommunications enclosure also includes an input cable including one or more optical fibers optically coupled to ruggedized first de-mateable optical connection locations at the fiber optic adapters. The first de-mateable optical connection locations are configured such that drop cables can be optically coupled to the one or more optical fibers of the input cable via ruggedized fiber optic connectors mated with the ruggedized outer ports of the fiber optic adapters. The telecommunications enclosure further includes a stub cable that enters the housing at a location other than the first side. The stub cable has a free end including a ruggedized second de-mateable optical connection location coupled to at least one of the one or more optical fibers of the input cable. The second de-mateable optical connection location optionally is accessible at the first side of the housing. In certain examples, the stub cable and the input cable optionally enter the housing at the same location. In certain examples, the stub cable optionally has a length less than or equal to one meter.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the examples disclosed herein are based.

DETAILED DESCRIPTION

Figure 1:
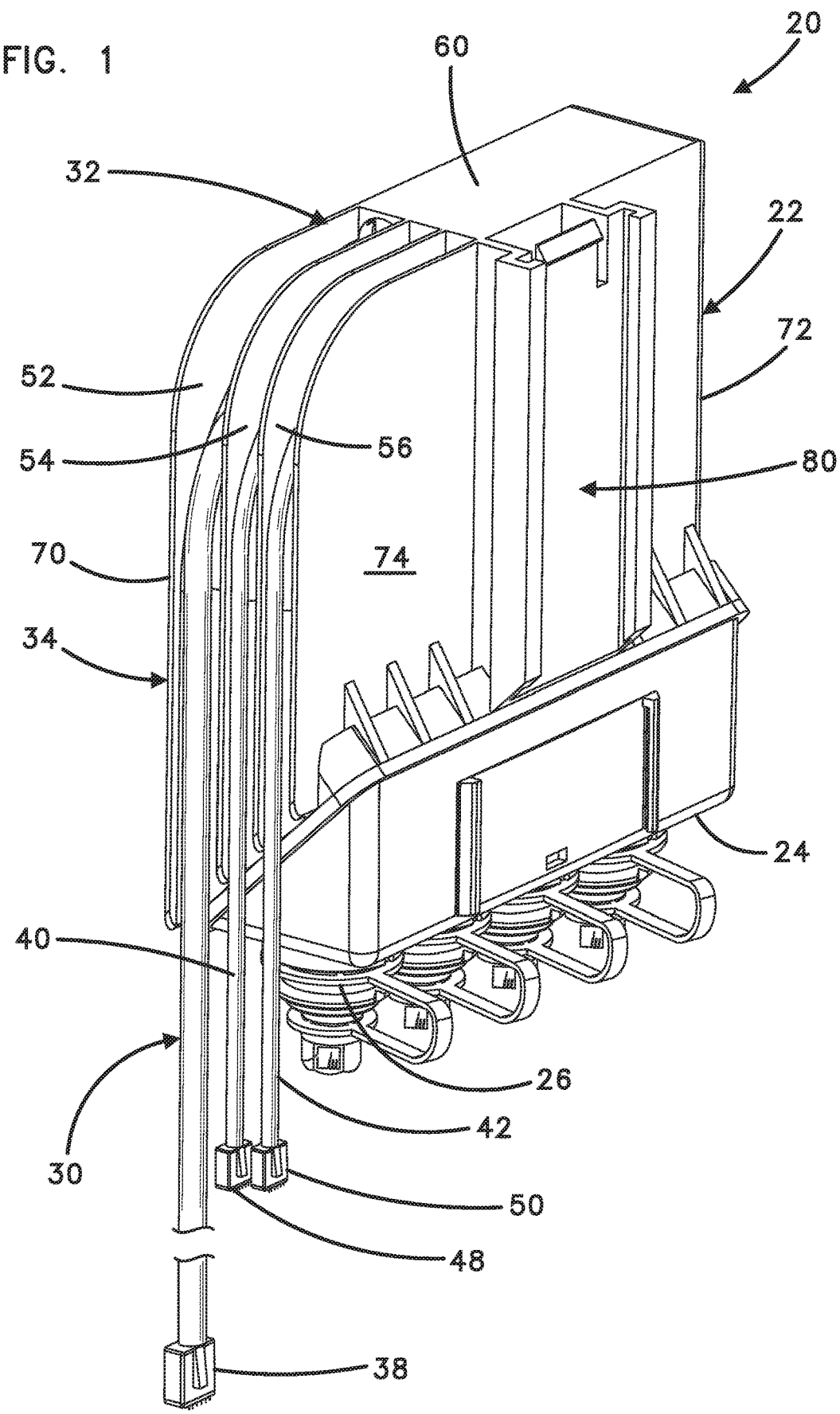
FIG. 1 is a front, right side perspective view of a telecommunications enclosure in accordance with the principles of the present disclosure.
Figure 2:
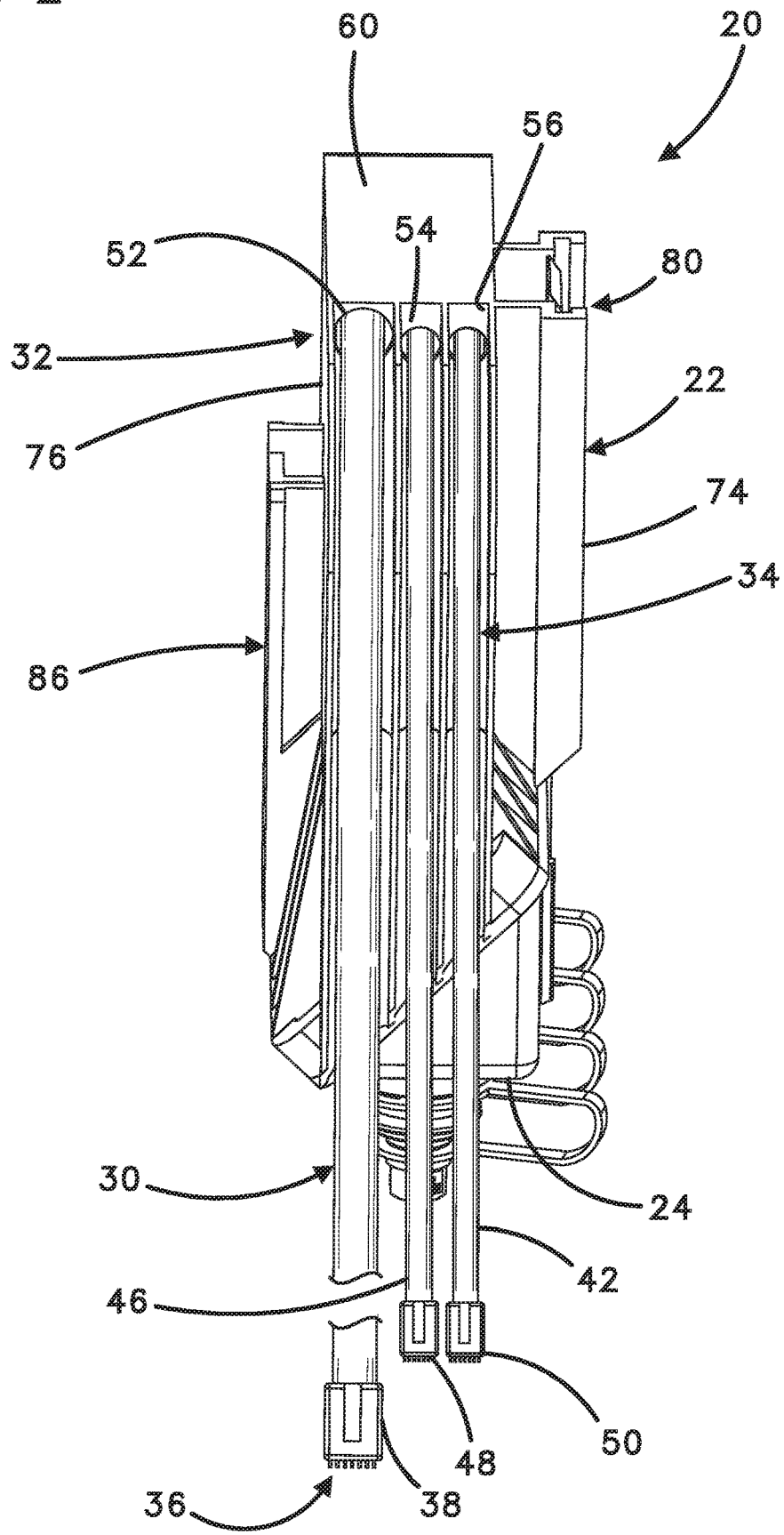
FIG. 2 is a right side view of the telecommunications enclosure of FIG. 1.

FIGS. 1-9 depict a telecommunications enclosure 20 in accordance with the principles of the present disclosure. The telecommunications enclosure 20 includes a housing 22 defining an interior 25 (see schematic depiction at FIG. 15). The housing 22 includes a first side 24. The telecommunications enclosure 20 also includes a plurality of fiber optic adapters 26 positioned at the first side 24 of the housing 22. The fiber optic adapters 26 have ruggedized outer ports 28 (see FIG. 11) fixed relative to the first side 24 of the housing 22. The ruggedized outer ports 28 are accessible from outside the housing 22 at the first side 24 of the housing 22. The telecommunications enclosure 20 further includes a fiber optic cable 30 that enters/exits the interior 25 of the housing 22 at a cable entrance/exit location 32 that is not located at the first side 24 of the housing 22. The fiber optic cable 30 is routed along a path 34 which extends along an exterior of the housing 22 from the cable entrance/exit location 32 to the first side 24. The housing 22 optionally includes ears, tabs, fastener openings or other structure for allowing the housing to be mounted via fasteners to a mounting structure such as a pole, wall or the like. The housing 22 optionally includes a mechanical interface (e.g., a snap-fit structure; rails, a latch or latches, a catch or catches, a slot or slots; a track or tracks; a receptacle or receptacles; fastener openings, etc.) for attaching a mounting bracket to the housing 22, wherein the mounting bracket includes structure for facilitating mounting the housing to a mounting structure such as a pole, wall or the like.

In certain examples, the fiber optic cable 30 is an input cable having at least one optical fiber or a plurality of optical fibers. In certain examples, the input optical cable is relatively long. For example, the input cable can be at least 10 meters long, or at least 50 meters long, or at least 100 meters long. In certain examples, a free end 36 of the fiber optic cable 30 can be terminated by a fiber optic connector 38. The fiber optic connector 38 can be a ruggedized fiber optic connector. The fiber optic connector 38 can be a single-fiber ruggedized fiber optic connector or a multi-fiber ruggedized fiber optic connector. The fiber optic connector 38 can be a female fiber optic connector or a male fiber optic connector. In certain examples, the fiber optic cable 30 includes an outer jacket, one or more strength members (e.g., reinforcing rods such as fiberglass reinforced epoxy rods or string-like reinforcing elements such as fiberglass or Aramid yarn) and may optionally include an inner buffer tube for containing the one or more optical fibers.

It will be appreciated that the telecommunications enclosure 20 can optionally include more than one fiber optic cable that enter the housing 22 at the entrance/exit location 32 and that are routed along the path 34 along the exterior of the housing 22. For example, as depicted at FIG. 1, the telecommunications enclosure 20 includes the fiber optic cable 30 (e.g., an input cable) and also includes one or more additional cables such as stub cables. As depicted, the telecommunications enclosure 20 further includes first and second fiber optic stub cables 40, 42 that enter/exit the housing 22 at the entrance/exit location 32 and that are routed along the path 34 at the exterior of the housing 22. It is preferred for the stub cables 40, 42 to be substantially shorter than the input fiber optic cable 30. In certain examples, the fiber optic stub cables 40, 42 have lengths extending outside the housing 22 that are less than or equal to one meter. The stub cables 40, 42 includes free ends that are terminated by fiber optic connectors 48, 50. The fiber optic connectors 48, 50 can be positioned generally adjacent to the first side 24 of the housing 22 so as to be accessible at the first side 24. Therefore, the fiber optic connectors 48, 50 as well as the ruggedized outer ports 28 of the fiber optic adapters 26 can all be accessed as the same general location outside the housing 22 (e.g., at the first side 24).

In certain examples, the first side 24 of the housing 22 is a bottom side of the housing 22 and the ruggedized outer ports 28 as well as the fiber optic connectors 48, 50 are all accessible adjacent the bottom side of the housing 22. It will be appreciated that the fiber optic connectors 48, 50 can be ruggedized fiber optic connectors. Additionally, the fiber optic connectors 48, 50 can be single fiber connectors or multi-fiber connectors. Further, the fiber optic connectors 48, 50 can be female fiber optic connectors or male fiber optic connectors. The fiber optic cables of the stub cables 40, 42 can include outer jackets that each contain at least one optical fiber, or a plurality of optical fibers. The stub cables 40, 42 can include reinforcing strength elements such as epoxy reinforced rods or a string-like style reinforcing element such as Aramid yarn or other yarn. In certain examples, buffer tubes optionally can be used to protect to the optical fibers of the stub cables 40, 42. In certain examples, the reinforcing elements of the fiber optic cables (e.g., cables 32, 40 and 42) can be anchored to the telecommunications enclosure 20 adjacent the entrance/exit location 32 and can also be affixed to the fiber optic connectors located at the free ends of the fiber optic cables 30, 40 and 42. In certain examples, the entrance/exit location 32 can include a sealing material for sealing about the fiber optic cables 30, 40, and 42 as the cables 30, 40, and 42 enter the interior of the housing 22. Example sealing materials can include elastomeric materials such as rubbers or other materials such as gels, foams or other sealing materials.

In certain examples, the housing 22 of the telecommunications enclosure 20 can include at least one channel at the exterior of the housing 22 for receiving the fiber optic cable 30. In certain examples, the channel extends along at least a portion of the path 34. In certain examples, the channel can extend along a majority of the length of the path 34. As depicted at FIG. 1, the housing 22 includes three channels 52, 54 and 56 which are parallel and which extend along the path 34 at the exterior of the housing 22. As depicted, the channels 52, 54 and 56 extend from the entrance/exit location 32 along the path 34 generally to the first side 24 of the housing 22.

Figure 3:
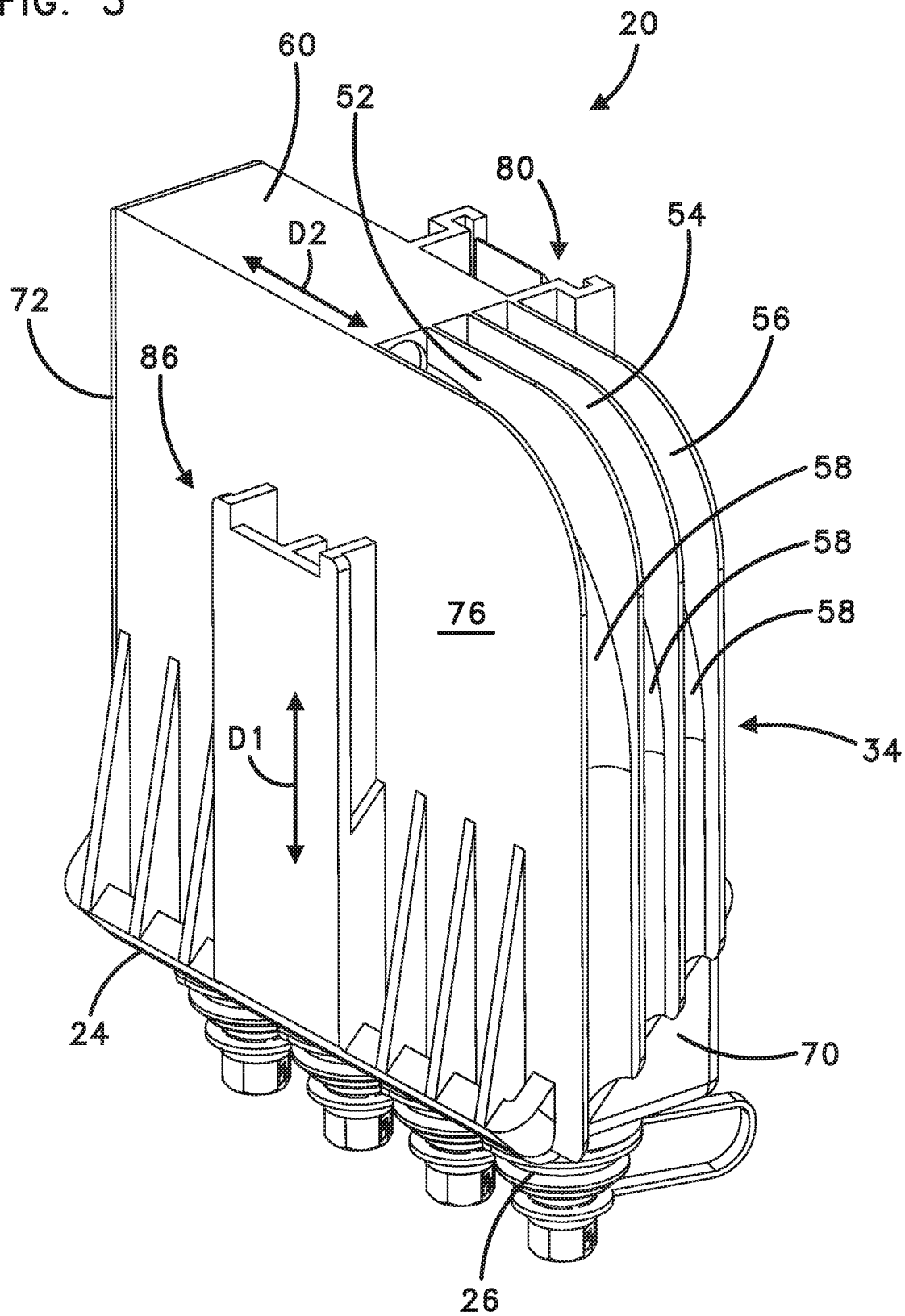
FIG. 3 is a rear, right side view of the telecommunications enclosures of FIG. 1 with the exterior cables of the telecommunications enclosure not shown.
Figure 4:
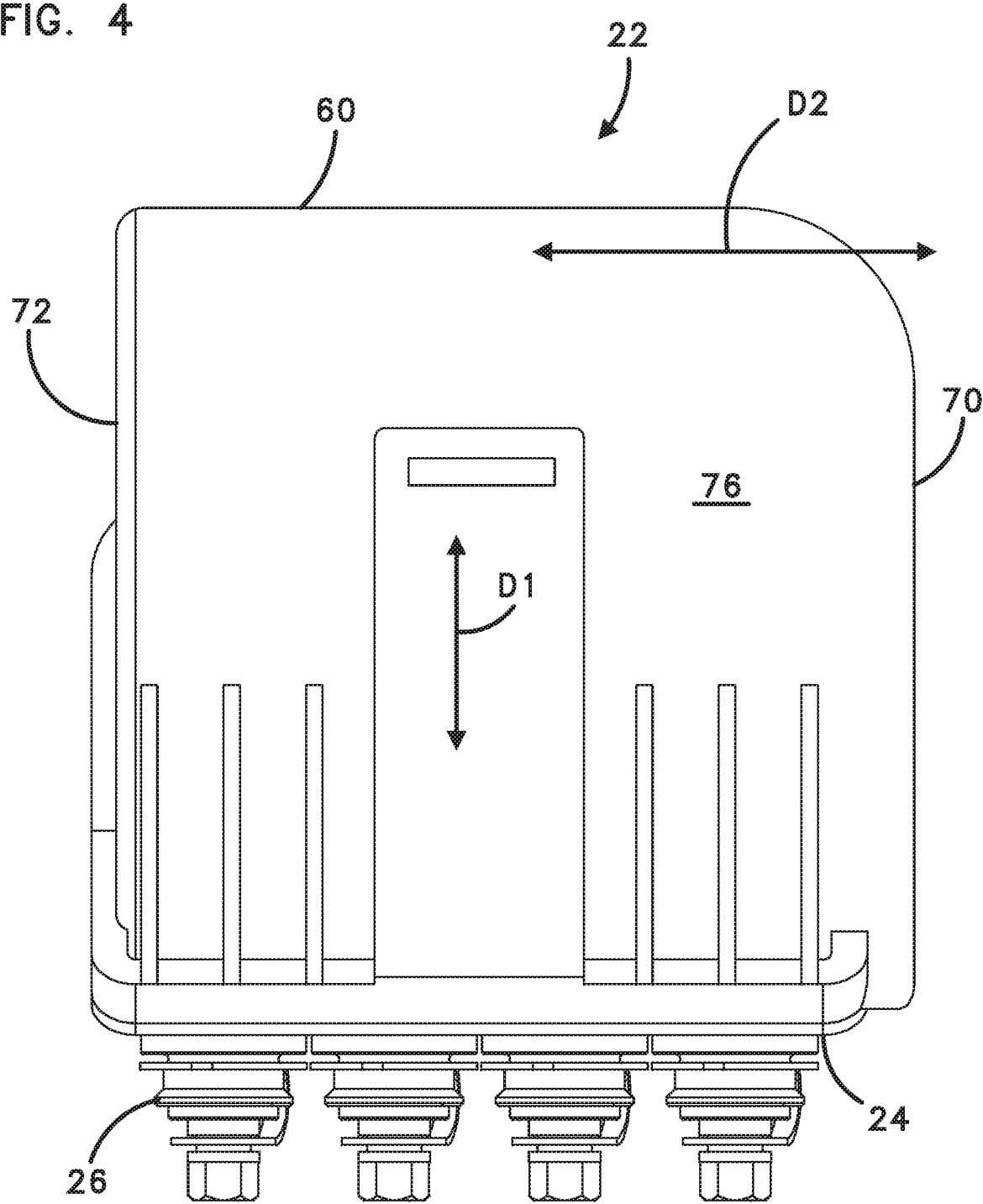
FIG. 4 is a rear view of the telecommunications enclosure of FIG. 1 with the exterior cables of the telecommunications enclosure not shown.
Figure 5:
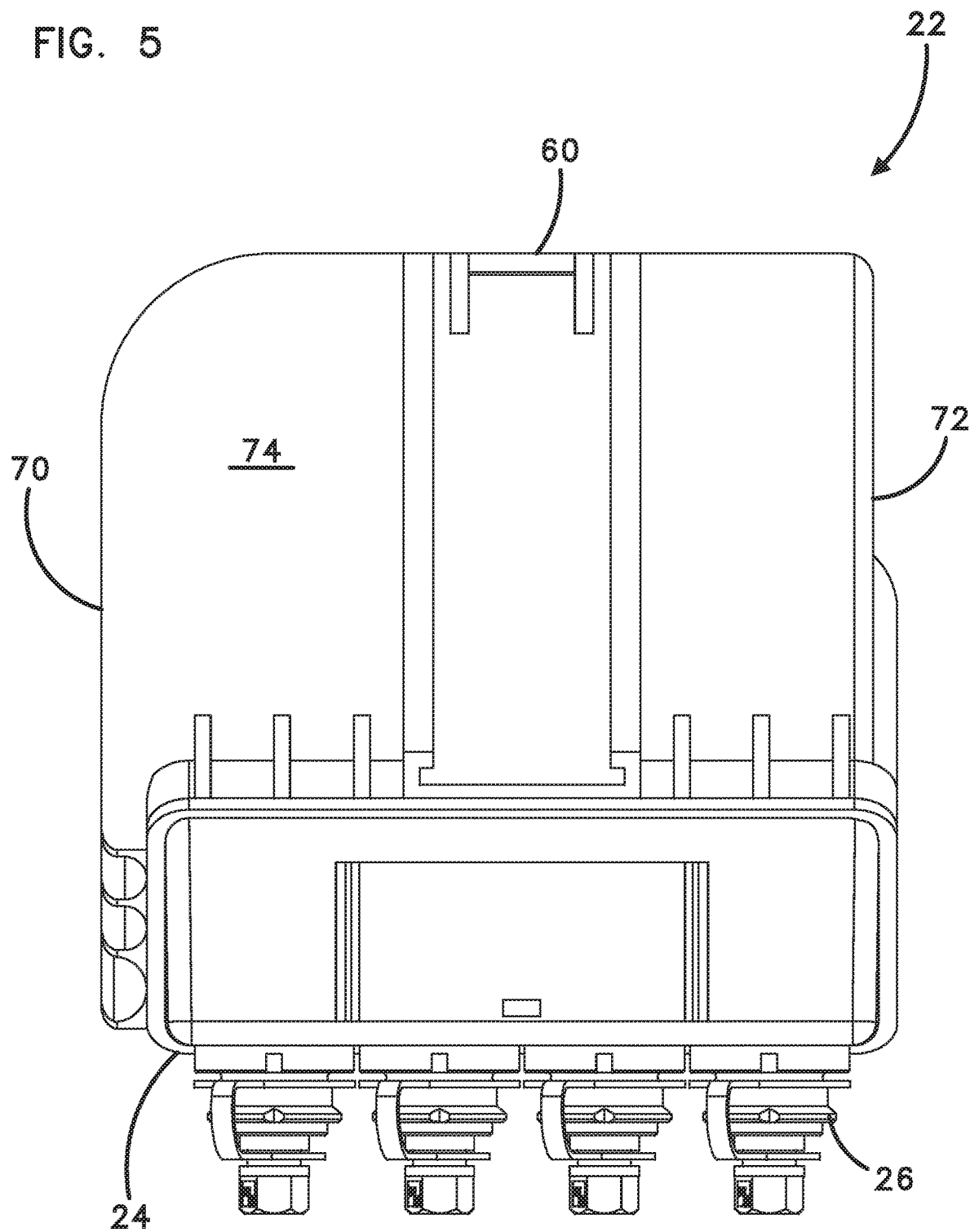
FIG. 5 is a front view of the telecommunications enclosure of FIG. 1 with the exterior cables of the telecommunications enclosure not shown.
Figure 6:
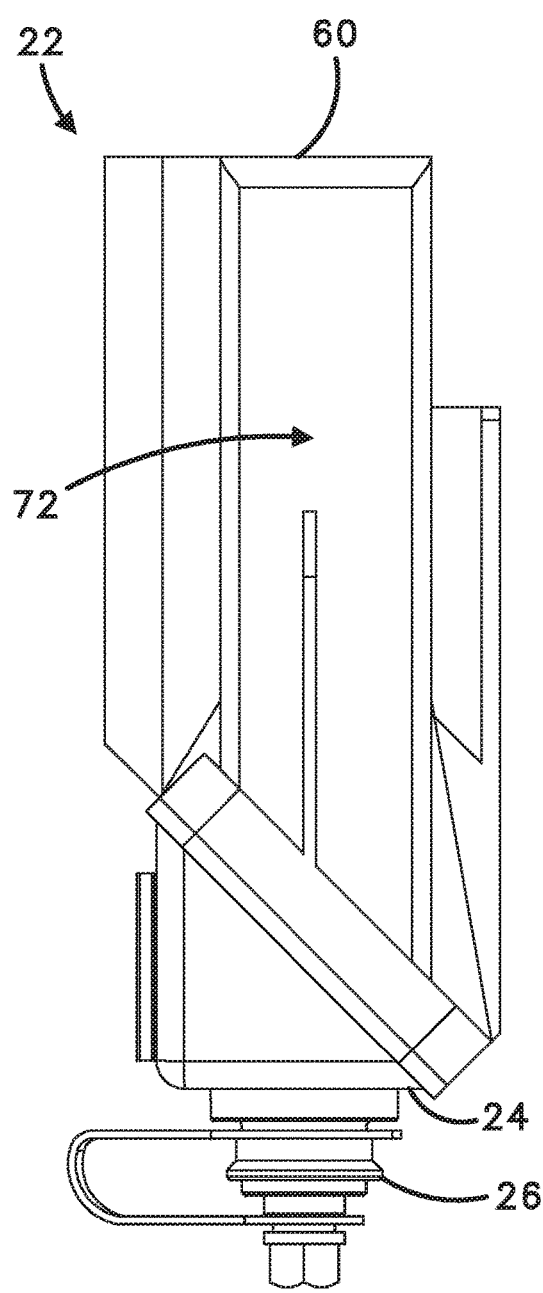
FIG. 6 is a left side view of the telecommunications enclosure of FIG. 1 with the exterior cables not shown.
Figure 7:
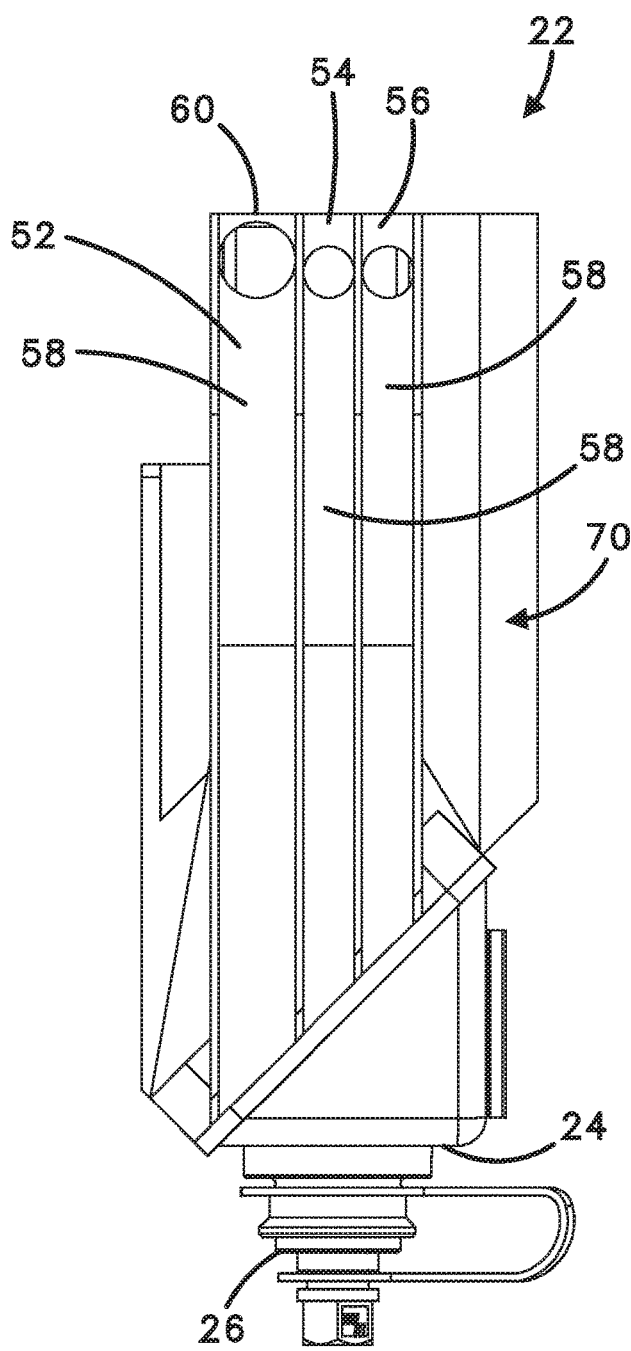
FIG. 7 is a right side view of the telecommunications enclosure of FIG. 1 with the exterior cables not shown.
Figure 8:
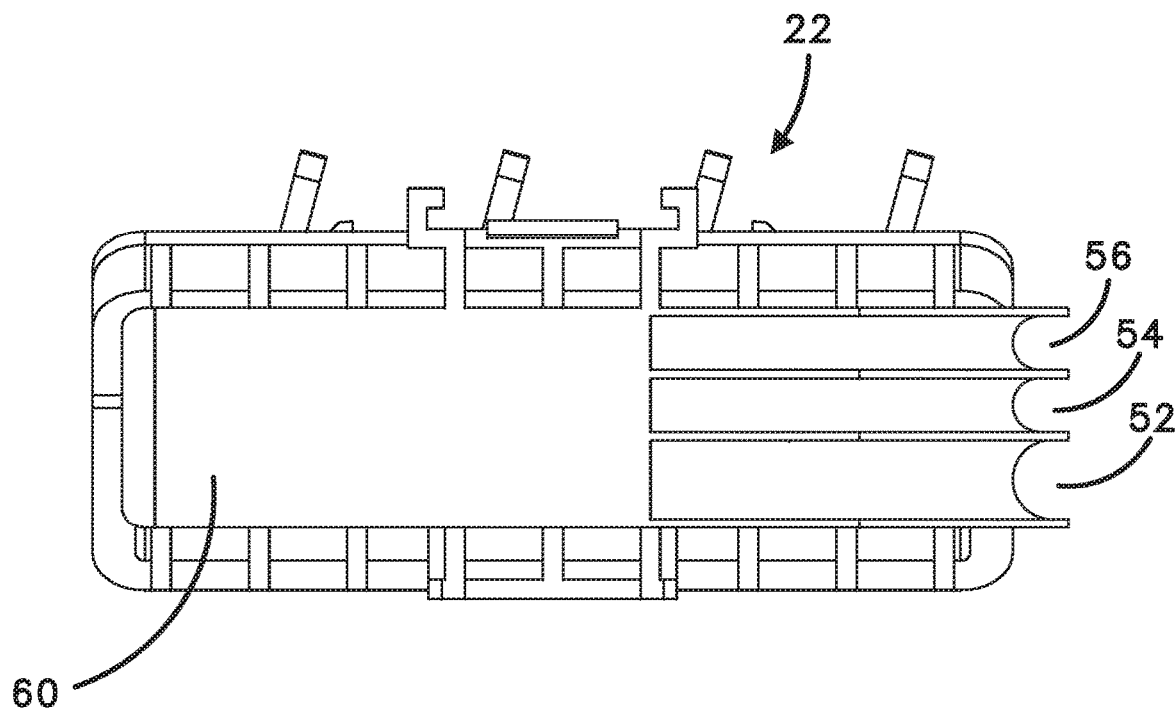
FIG. 8 is a top view of the telecommunications enclosure of FIG. 1 with the exterior cables not shown.
Figure 9:
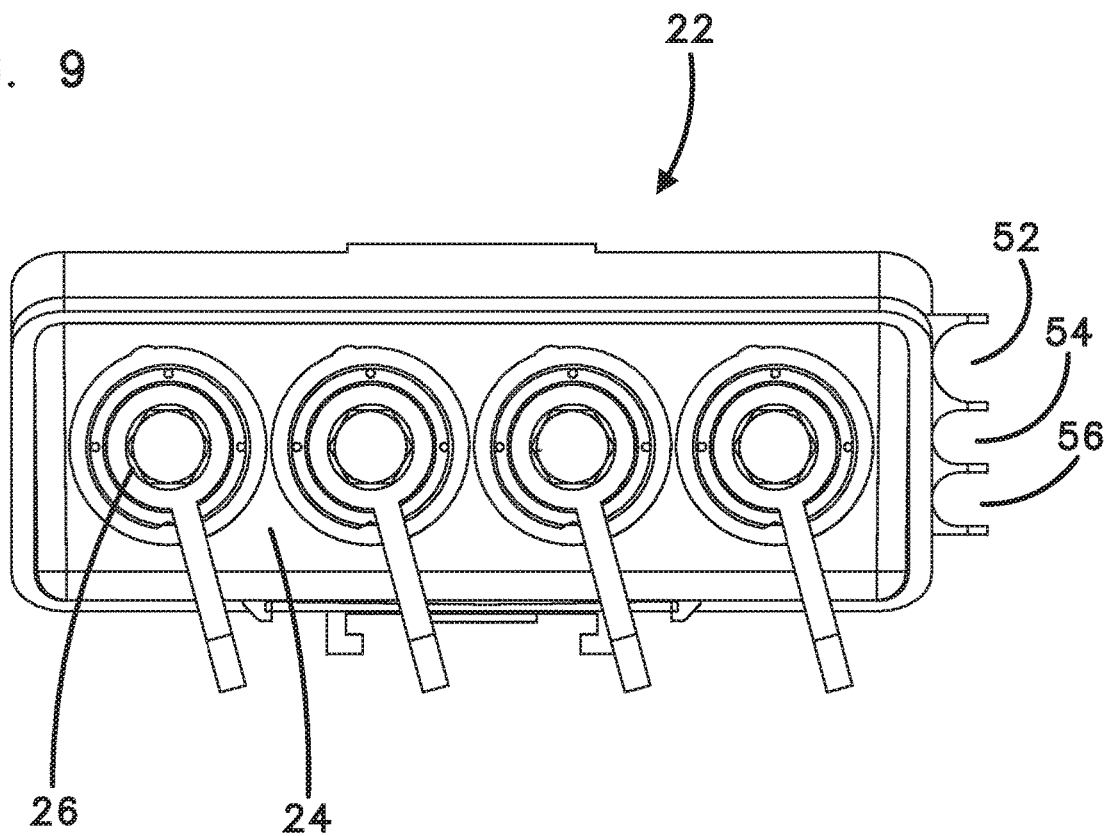
FIG. 9 is a bottom view of the telecommunications enclosure of FIG. 1 with the exterior cables not shown.

In certain examples, path 34 at the exterior of the housing 22 can include fiber routing and management structures. Example fiber routing and management structures can include cable bend radius limiters or other structures. As depicted at FIG. 1, the housing 22 includes a curved cable bend limiting structure or surface for guiding the fiber optic cable or cables around a corner at the exterior of the housing 22. For example, as shown at FIG. 3, curved bend radius limiters 58 are provided within the channels 52, 54, 56 at a corner of the housing 22 for guiding the fiber optic cables 30, 40, 42 around an upper corner of the housing 22.

In certain examples, the housing 22 of the telecommunications enclosure 20 includes a second side 60 positioned opposite from the first side 24. In the depicted example of FIG. 1, the cable entrance/exit location 32 is located at the second side 60. In certain examples, a first dimension D1 (see FIG. 4) extends between the first and second sides 24, 60. In certain examples, the fiber optic cable or cables (e.g., cables 30, 40 and 42) extend along a second dimension D2 (see FIG. 4) at the cable entrance/exit location 32. In certain examples, the first and second dimensions D1, D2 are oriented perpendicular relative to one another.

In certain examples, the curved cable bend radius limiting surface can form a rounded corner of the housing 22. In certain examples, the rounded corner of the housing extends between an upper side of the housing and a left or right side of the housing, and the fiber optic adapters 26 are located at a bottom side of the housing. In certain examples, the path 34 can extend from an upper/top side of the housing, along a left or right side of the housing to a lower/bottom side of the housing.

In certain examples, the fiber optic connectors 38, 48, and 50 as well as the fiber optic adapters 26 can provide de-mateable optical connection locations. In certain examples, the de-mateable optical connection locations can be ruggedized.

Referring to FIGS. 1-9, housing 22 can further include third and fourth opposite sides 70, 72 that extend between the first and second sides 24, 60, and fifth and sixth opposite sides 74, 76 that extend between the first and second sides 22, 60 and that also extend between the third and fourth sides 70, 72. In the depicted example, the first side 24 is a bottom side, the second side 60 is a top side, the third side 70 is a right side, the fourth side 72 is a left side, the fifth side 74 is a front side, and the sixth side 76 is a rear side. In the depicted example, the front and rear sides are major sides of the housing 24, and the top, bottom, left and right sides are minor sides of the housing.

In certain examples, the housing 22 of the telecommunications enclosure 20 can include a mechanical coupling interface 80 for attaching a housing 82 of a second telecommunications enclosure 84 (see FIGS. 13 and 14) to the housing 22 of the first telecommunications enclosure 20. In certain examples, the mechanical coupling interface 80 will be provided at the front side 74 of the housing 22 of the telecommunications enclosure 20. In certain examples, the housing 82 of the second telecommunications enclosure 84 can have a mechanical coupling interface 86 adapted to couple with mechanical coupling interface 80 (e.g., mate; provide a snap-fit connection; interlock; etc.). In certain examples, mechanical coupling interface 86 is at a rear or back side of the housing 82. In certain examples, the second telecommunications enclosure 84 can include a fiber optic stub cable adapted to optically couple with one of the fiber optic stub cables 40, 42 of the telecommunications enclosure 20 to provide optical connectivity to the second telecommunications enclosure 84. In certain examples, the housing 22 can include the mechanical coupling interface 86 at its rear side to allow a plurality of the housings 22 to be coupled together is a stacked configuration, or to allow a mounting bracket equipped with the mechanical coupling interface 80 to be mounted to the rear side of the housing 22.

Figure 10:
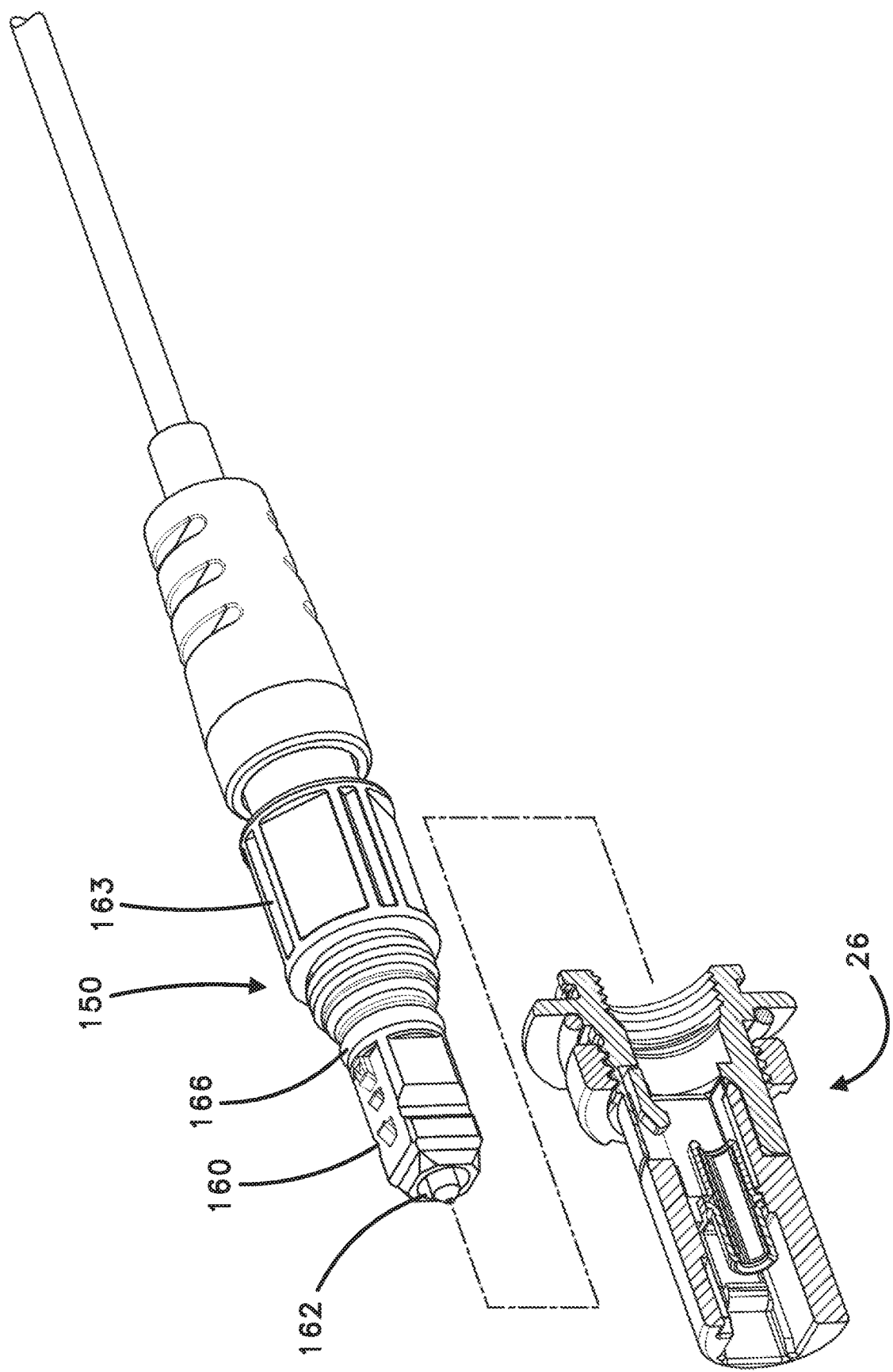
FIG. 10 is a partial cross-sectional view of an example ruggedized fiber optic adapter that can be used with the telecommunications enclosure of FIG. 1, a ruggedized fiber optic connector configured to mate with the ruggedized fiber optic adapter is also shown.
Figure 11:
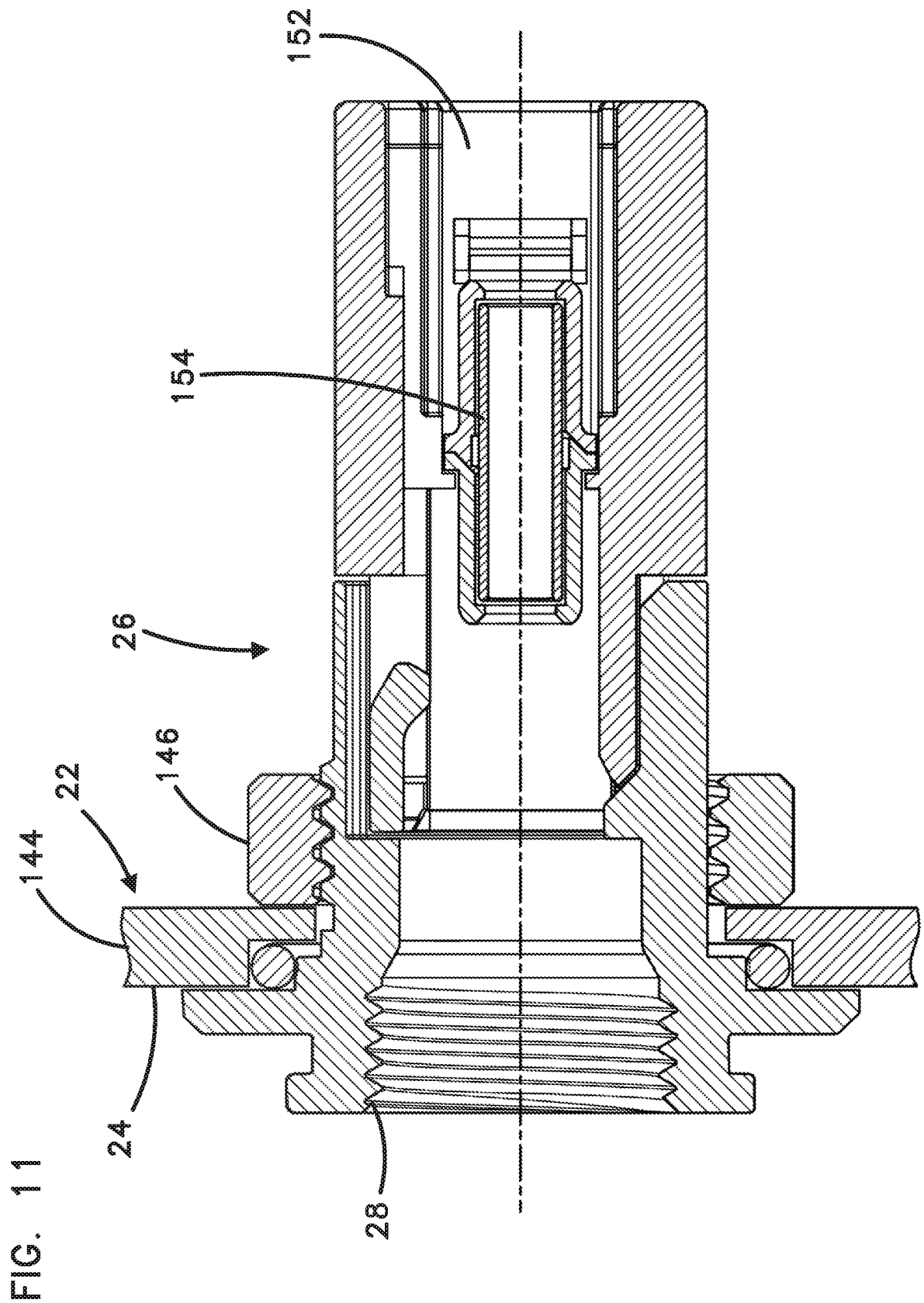
FIG. 11 is a cross-sectional view of the ruggedized fiber optic adapter of FIG. 10.

FIGS. 10 and 11 depict an example configuration of the ruggedized fiber optic adapter 26. The ruggedized fiber optic adapter 26 is shown mounted to a wall 144 (see FIG. 11) defining the first side 24 of the housing 22. In the depicted example, the ruggedized fiber optic adapter 26 is secured to the wall 144 by a fastener such as a nut 146. In other examples, the ruggedized fiber optic adapter 26 can be bonded to the wall 144, unitarily formed with the wall or otherwise attached to the wall 144. The wall 144 includes an outer face defining the first side 24 of the housing 22. The ruggedized fiber optic adapter 26 includes a ruggedized outer port 28 located at the first side 24. The ruggedized outer port 28 is accessible from outside the housing 22 at the first side 24. The ruggedized outer port 28 is accessible from outside the housing 22 and is configured for receiving a hardened fiber optic connector 150 (see FIG. 10). The ruggedized outer port 28 can include a mechanical connection interface having a robust configuration. Example mechanical connection interfaces can include twist-to-lock interfaces such as threaded interfaces and bayonet-style interfaces. The ruggedized outer port 28 can also include a seal or sealing surface for providing a sealed connection when the ruggedized fiber optic connector 150 is installed within the ruggedized outer port 28. Plugs or caps can be used to close and seal the ruggedized outer ports 28 when ruggedized fiber optic connectors 150 are not plugged therein. In certain examples, the hardened fiber optic adapters 26 are sealed relative to the wall 144.

Referring still to FIGS. 10 and 11, the ruggedized fiber optic adapter 26 also includes an inner port 152 which is positioned inside the interior of the housing 22. In certain examples, the inner port 152 is adapted for receiving a non-hardened fiber optic connector (e.g., an SC connector or an LC connector) located inside the housing 22. In other examples, the inner port 152 can receive a greatly simplified fiber optic connector which may include only a ferrule for supporting an optical fiber or it may be ferrule-less. In certain examples, ruggedized fiber optic adapter 26 can include a ferrule alignment structure such as ferrule alignment sleeve 154 which is in coaxial alignment with the ruggedized outer port 28 and the inner port 152. In certain examples, the ferrule alignment sleeve 154 is adapted for coaxially aligning a ferrule of ruggedized fiber optic connector 150 received within the ruggedized outer port 28 with the ferrule of the non-hardened fiber optic connector received within the inner port 152. In other examples, ferruleless connectors and ferruleless alignment structures/adapters can be used.

Referring to FIG. 10, a ruggedized fiber optic connector 150 includes a connector body or plug 160 supporting a ferrule 162 which supports an end portion of an optical fiber. A twist-to-lock fastener 163 such as a threaded fastener or a bayonet-style fastener is mounted on the connector body and is configured to be rotated/turned relative to the connector body about a central axis of the fiber optic connector 150. The fiber optic connector 150 can further include a seal 166 that provides an environmental seal between the ruggedized fiber optic adapter 26 and the exterior of the connector body 160 when the ruggedized fiber optic connector 150 is installed within the hardened outer port 28. It will be appreciated that the fiber optic connector 150 can be used to terminate the end of a drop cable or other cable desired to be coupled to optical fibers corresponding to the fiber optic adapters 26. Additionally, the ruggedized fiber optic connector 150 is an example of the type of ruggedized fiber optic connector that could be used as one or more of the fiber optic connectors 38, 48, 50 provided at the free ends of the cables 30, 40 and 42.

Example hardened fiber optic adapters and hardened fiber optic connectors are disclosed in U.S. Pat. No. 8,414,196, which is hereby incorporated by reference in its entirety.

The fiber optic connectors 38, 48, and 50 can include hardened multi-fiber optical fiber connectors (HMFOC). Each HMFOC can include environmental seals for sealing the connectors in outside environments. Each HMFOC can include fasteners such as threaded fasteners or bayonet-style fasteners for providing robust connector-to-connector mechanical connections. HMFOC's can include male connectors on cables, female connectors on cables, ports/adapters on housings and other structures. HMFOC's can include multi-fiber ferrules including fiber receiving arrangements defining a plurality of fiber receiving positions. In certain examples, the fiber receiving positions can be arranged in one or more rows of fiber receiving positions. The multi-fiber ferrules can include MPO ferrules.

Figure 12:
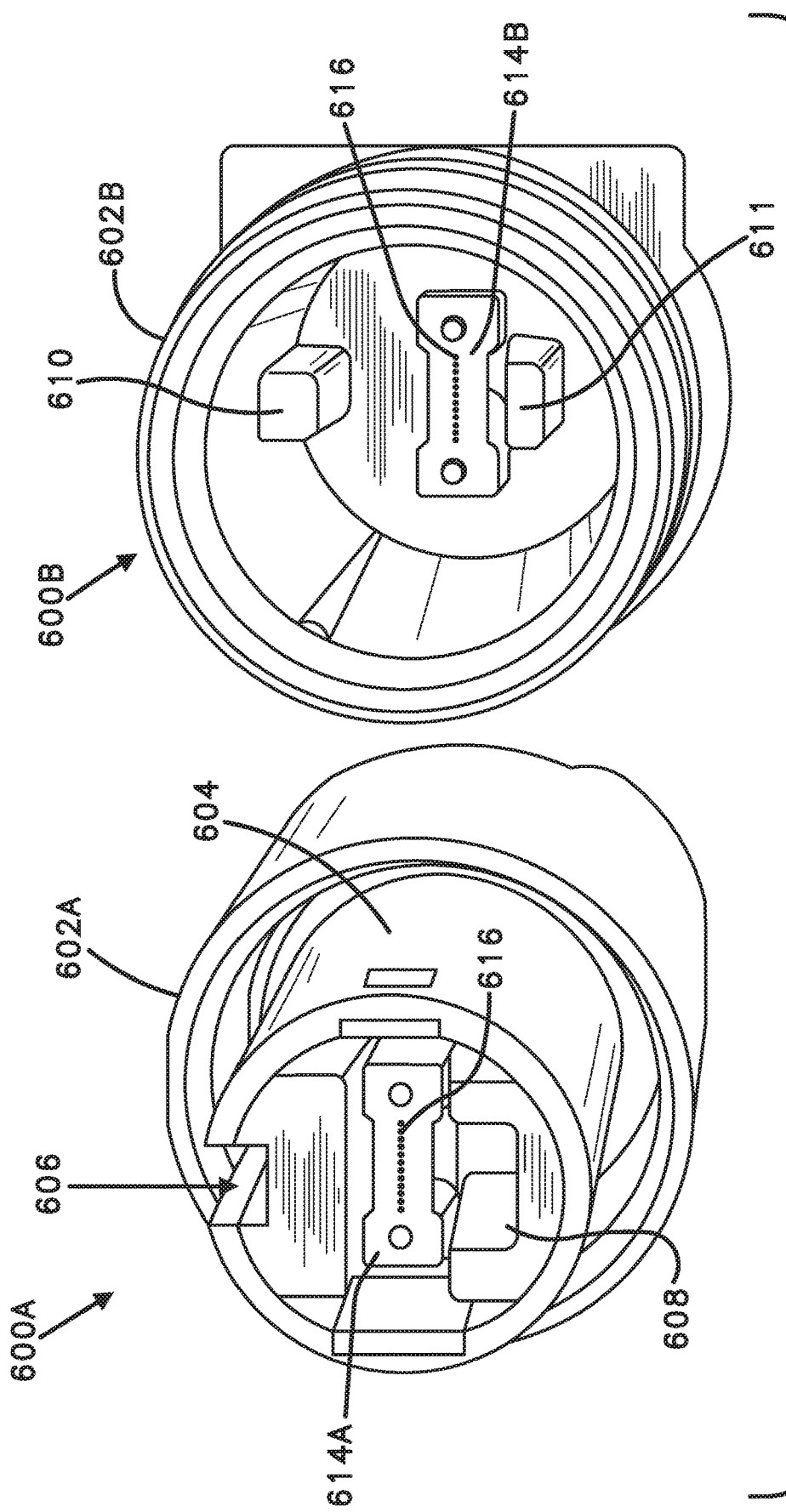
FIG. 12 depicts example male and female ruggedized fiber optic connectors that can be used to terminate the ends of the exterior cables of the telecommunications enclosure of FIG. 1.

FIG. 12 shows example mating male and female HMFOC connectors 600a, 600b, either of which can be used as one or more of the fiber optic connectors 38, 48 or 50 provided at the ends of the cables 30, 40 and 42. The male and female connectors 600a, 600b include intermatable mechanical coupling interfaces. For example, the male connector 600a includes an internally threaded nut 602a that threads on a threaded portion 602b of the female connector 600b. Also, the male connector 600a includes a plug portion 604 with openings 606, 608 that mate with projections 610, 611 on the female connector 600b to provide alignment during coupling. The connectors 600a, 600b include ferrules 614a, 614b (e.g., MPO ferrules) having fiber receiving arrangements that include fiber receiving positions 616 (e.g., a row of 12 fiber receiving positions) that align when the connectors 600a, 600b are mated to provide optical connections between the optical fibers supported by the ferrules 614a, 614b. Further details of example HMFOC connectors are disclosed by U.S. Pat. No. 7,264,402, which is hereby incorporated by reference in its entirety.

Fiber optic connectors used with telecommunications enclosures of the type disclosed herein can also include ruggedized single fiber connectors. Ruggedized single fiber connectors can include environmental seals for sealing the connectors in outside environments. Ruggedized single fiber connectors can include fasteners such as threaded fasteners or bayonet-style fasteners for providing robust connector-to-connector mechanical connections (as used herein the term "connector" includes fiber optic adapters). Ruggedized single fiber connectors can include male connectors on cables, female connectors on cables, ports/adapters on housings and other structure. Ruggedized single fiber connectors can include ferrules supporting single fibers, or non-ferrulized connectors. Further details about example hardened single fiber connectors are disclosed by U.S. Pat. No. 7,959,361 which is hereby incorporated by reference in its entirety.

In certain examples, telecommunications enclosure arrangements in accordance with the principles of the present disclosure can be used to implement fiber optic indexing architectures. A typical fiber optic indexing architecture includes a plurality of optical fibers having first ends positioned at a first fiber position matrix and second ends positioned at a second fiber position matrix. The fiber position matrices typically include one or more rows of optical fiber positions. In a typical indexing configuration, the optical fibers are indexed between the first and second matrices such that the ends of the optical fibers are at different positions at the first matrix as compared to the second matrix. In other words, an optical fiber having a first end at a first position at the first matrix will be indexed such that the second end of the optical fiber is at a second, different position at the second matrix. Optical fibers that are not indexed between the two position matrices can be routed to a different connection location (e.g., a drop location). Example indexing configurations are disclosed by U.S. Pat. No. 9,348,096, which is hereby incorporated by reference in its entirety. As used herein, the term "optical fiber" can include a continuous, uninterrupted segment of optical fiber as well as multiple segments of optical fiber that are spliced or otherwise connected together.

Figure 15:
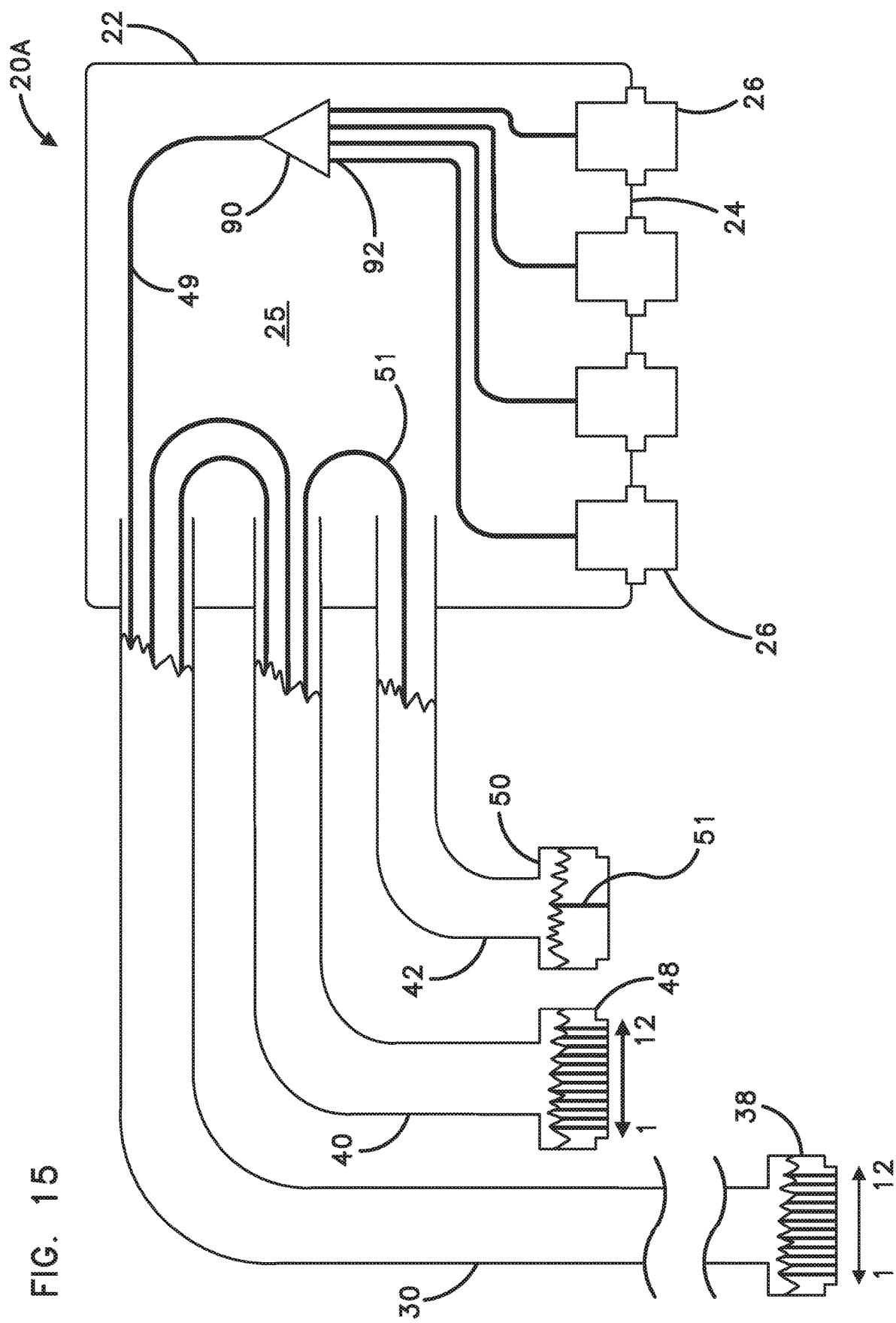
FIG. 15 is a schematic depiction of a fiber optic indexing architecture incorporated as part of the telecommunications enclosure of FIG. 1.

FIG. 15 schematically depicts a telecommunications enclosure 20a which represents the telecommunications enclosure 20 of FIG. 1 equipped with a fiber indexing architecture. As depicted, the fiber optic connector 38 of the input fiber optic cable 30 includes a plurality of optical fiber positions (e.g., twelve optical fiber positions) that may be defined by a structure such as a ferrule (e.g., an MPO ferrule). Similarly, the fiber optic connector 48 of the first fiber optic stub cable 40 also defines a plurality of fiber positions (e.g., twelve fiber positions) that may be defined by a structure such as a ferrule (e.g., an MPO ferrule). In the depicted example, a plurality of optical fibers are indexed between the fiber optic connector 38 and the fiber optic connector 48. For example, in the case of a twelve fiber configuration, the fibers positioned at positions 2-12 at the fiber matrix of the fiber optic connector 38 are shifted or indexed to positions 1-11 at the fiber optic connector 48. The optical fiber 49 corresponding to position 1 of the fiber optic connector 38 is optically connected to a passive optical splitter 90 having outputs 92 coupled to the fiber optic adapters 26. Thus, the optical fiber corresponding to position 1 of the fiber optic connector 38 is optically connected to the fiber optic adapters 26 through the intermediate passive optical splitter 90. In other examples, a wavelength division multi-plexer may be used instead of a passive optical splitter. Still referring to FIG. 15, the second fiber optic stub cable 42 supports one optical fiber 51 which is optically connected to position 12 of the fiber optic connector 48. Thus, the fiber optic connector 50 of the second fiber optic stub cable 42 is preferably a single fiber optical connector.

Figure 16:
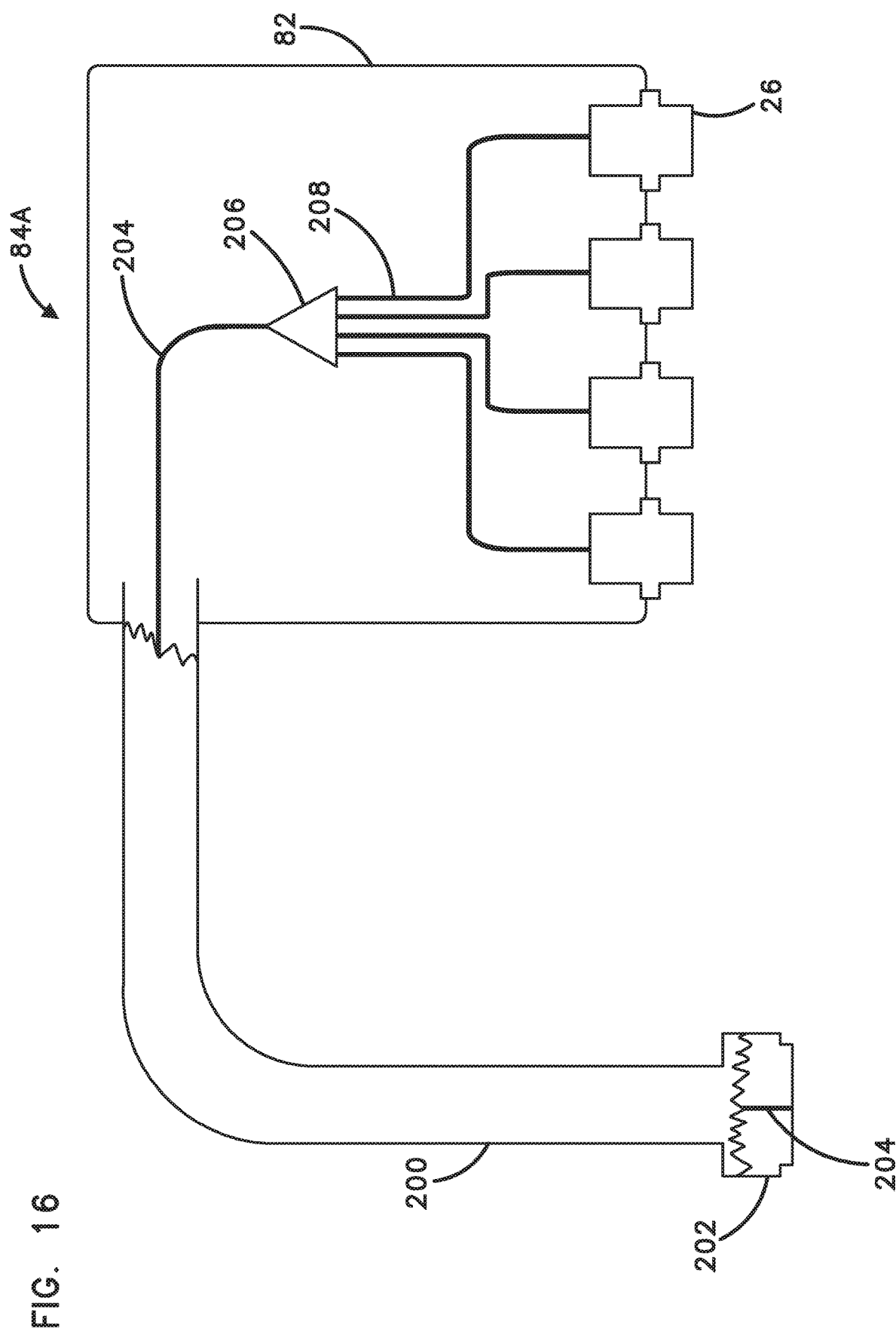
FIG. 16 is a schematic view depicting an example expansion enclosure suitable for use with the telecommunications enclosure of FIG. 15.

In certain examples, a plurality of the telecommunications enclosures 20a can be daisy-chained together to form an indexing chain. To daisy-chain the telecommunications enclosures 20a together, the input fiber optic cable 30 of a subsequent one of the telecommunications enclosures 20a can be optically connected to the first fiber optic stub cable 40 of a previous one of the telecommunications enclosures 20a. In certain examples, the second fiber optic stub cable 42 can be adapted for coupling to another telecommunications enclosure, such as an expansion enclosure. In certain examples, example expansion enclosures have the same housing 22 as the enclosures 20, 20a. In some examples, the expansion enclosure differs from the telecommunications enclosure 20, 20a only by the internal optical circuitry. In other examples, the expansion enclosure may have a different number (e.g., 0, 1, 2, 3, 4, etc.) and/or type of stub fibers, a different number (e.g., 2, 3, 4, 6, 8, 10, 12, 16, 24, etc.) and/or type (e.g., single-fiber, multi-fiber, ruggedized, non-ruggedized, etc.) of ports FIG. 16 shows an example expansion enclosure 84a adapted to be coupled to the second fiber optic stub cable 42 of the telecommunications enclosure 20a. It will be appreciated that the expansion enclosure 84a can have a mechanical interface 86 for allowing a housing 82 of the expansion enclosure to be attached to the housing 22 of the telecommunication enclosure 20a at a mechanical interface 80. The interface 86 can be at the rear of the housing 82 and the interface 80 can be at the front of the housing 22. The expansion enclosure 84a includes a stub cable 200 having a connectorized free end 202 adapted to be coupled to the fiber optic connector 50 of the second fiber optic stub cable 42 of the telecommunications enclosure 20a. In certain examples, the stub cable 200 can include an optical fiber 204. As depicted at FIG. 16, the optical fiber 204 couples to an input side of a splitter or wavelength division multi-plexer 206 provided within the housing 82 of the enclosure 84a. Outputs 208 of the splitter or wavelength multi-plexer are coupled to or routed to fiber optic adapters 26 of the enclosure 84a.

In the example of FIG. 15, the fiber 49 corresponding to position 1 of the fiber optic connector 38 provides a forward feed that rather than being indexed to the fiber optic connector 48, is optically connected to the splitter 90. The optical fiber 51 corresponding to position 12 of the first fiber optic stub cable 40 provides a reverse feed that is directed to the second fiber optic stub cable 42 thereby providing a source of optical connectivity for use in providing optical connectivity expansion by adding the expansion enclosure 84a to the telecommunications enclosure 20a.

Figure 17:
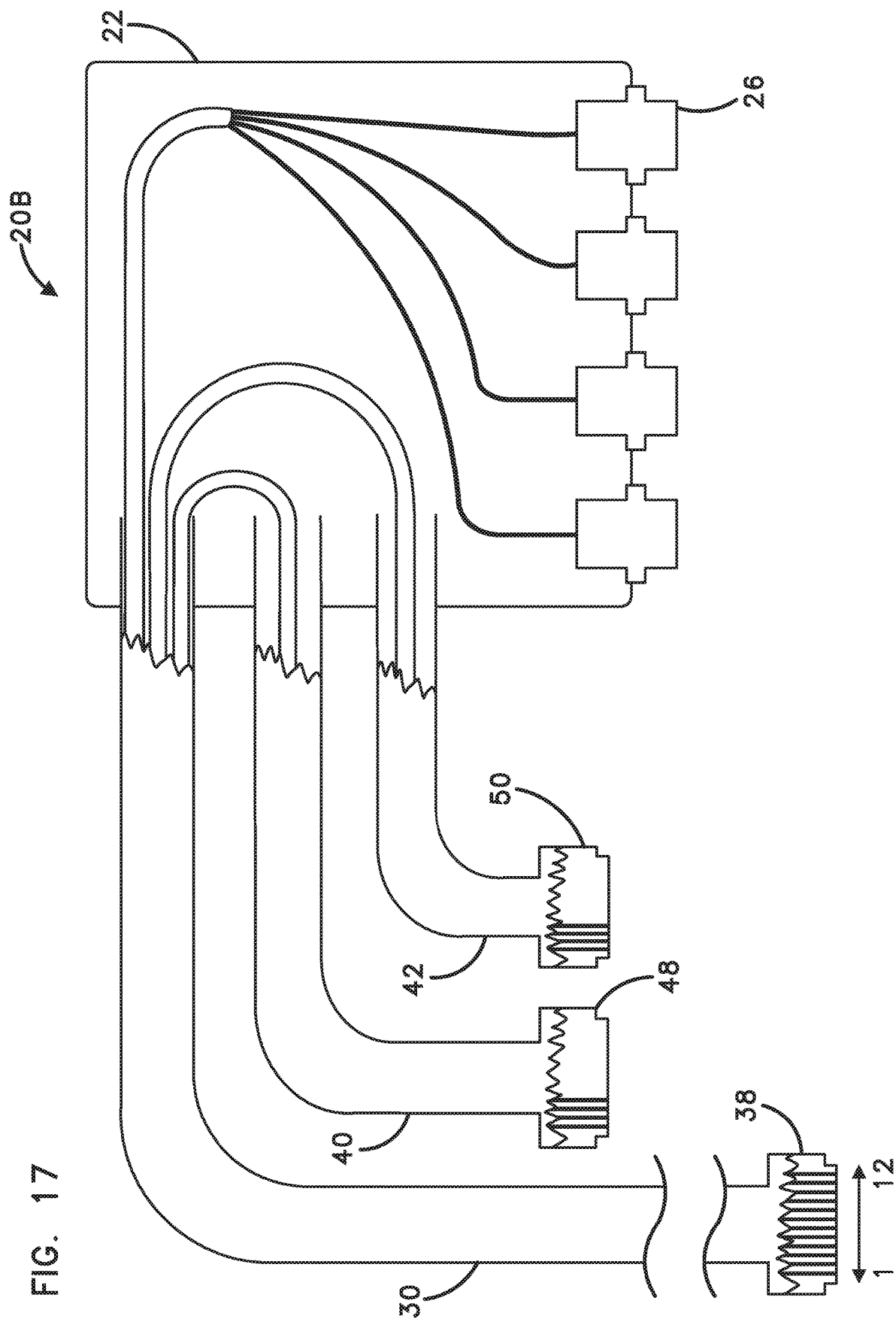
FIG. 17 schematically depicts an example fiber optic expansion architecture incorporated as part of the telecommunications enclosure of FIG. 1.

FIG. 17 schematically shows a telecommunications enclosure 20b having the same mechanical features as the telecommunications enclosure 20, but which has been depicted to include a fiber optic expansion architecture. The telecommunications enclosure 20b includes the input fiber optic cable 30 having the fiber optic connector 38. The fiber optic connector 38 is shown as a multi-fiber fiber optic connector including a plurality of fiber positions (e.g., twelve fiber positions) occupied by corresponding optical fibers. In a preferred example, the fiber optic connector 38 can include a multi-fiber ferrule such as an MPO ferrule. The telecommunications enclosure 20b also includes the first fiber optic stub cable 40 which is terminated by the fiber optic connector 48. The fiber optic connector 48 of FIG. 17 is shown supporting four optical fibers of the first fiber optic stub cable 40. The telecommunications enclosure 20b further includes the second stub cable 42 which is terminated by the fiber optic connector 50. The fiber optic connector 50 of FIG. 17 supports a plurality of optical fibers of the second fiber optic sub cable 42. Referring to FIG. 17, the optical fibers corresponding to positions 1-4 of the fiber optic connector 38 are optically connected to the fiber optic adapters 26 at the first side 24 of the housing 22. The optical fibers corresponding to positions 5-8 of the fiber optic connector 38 are shown optically connected to positions 1-4 of the fiber optic connector 48. Additionally, the optical fibers corresponding to positions 9-12 of the fiber optic connector 38 are shown optically connected to positions 1-4 of the fiber optic connector 50 of the second fiber optic sub cable 42. In certain examples, the ruggedized outer ports 28 of the fiber optic adapters 26 provide de-mateable connection locations adapted for coupling with drop fiber optic cables. The fiber optic connectors 48, 50 of the stub cables 40, 42 provide de-mateable fiber optic connection locations for connecting with expansion housings that can be mechanically mounted on the housing 22 of the telecommunications enclosure 20b.

Figure 13:
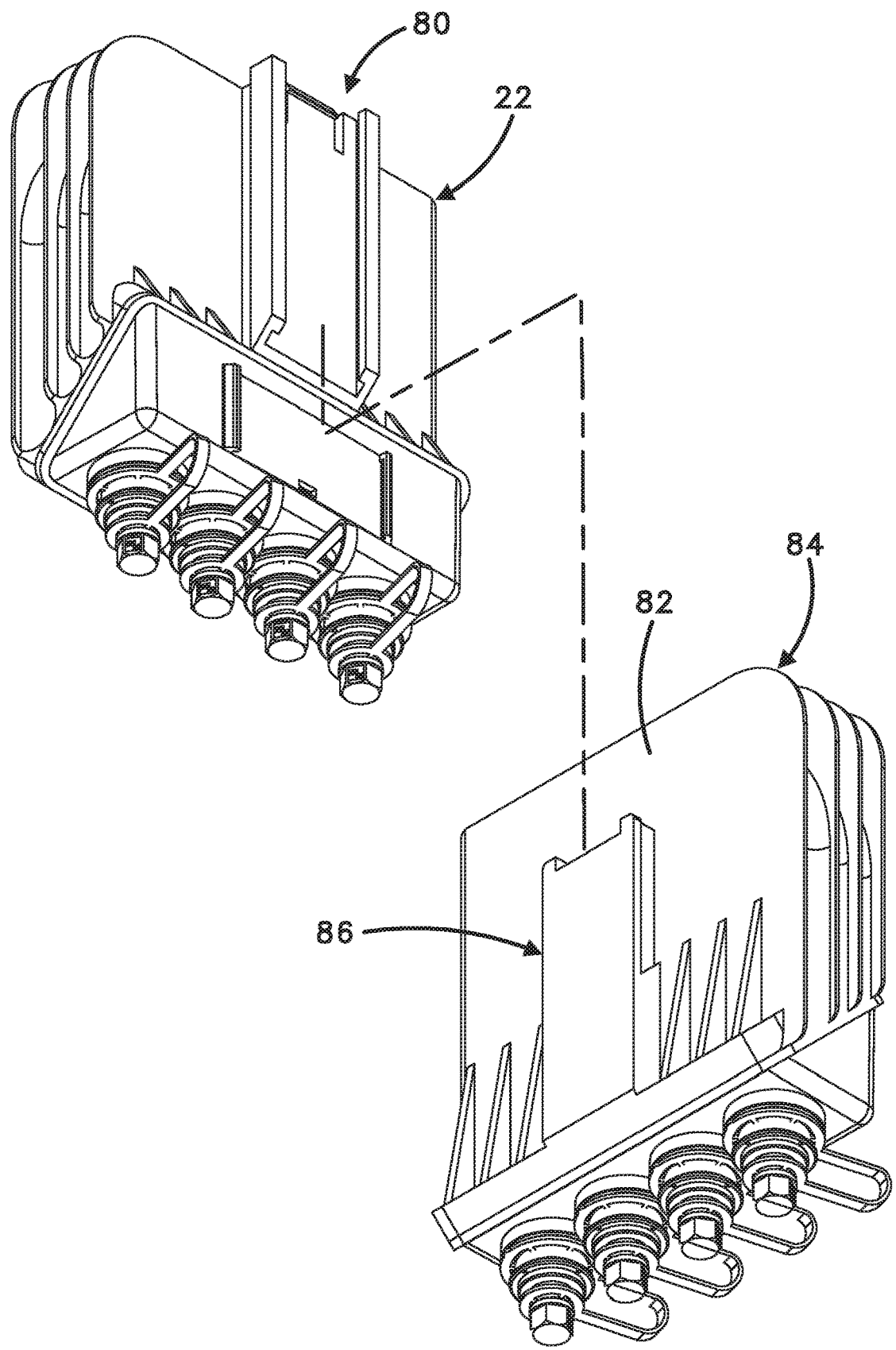
FIG. 13 shows the telecommunications enclosure of FIG. 1 in combination with an add-on expansion enclosure that can be secured to a front side of the telecommunications enclosure of FIG. 1.
Figure 14:
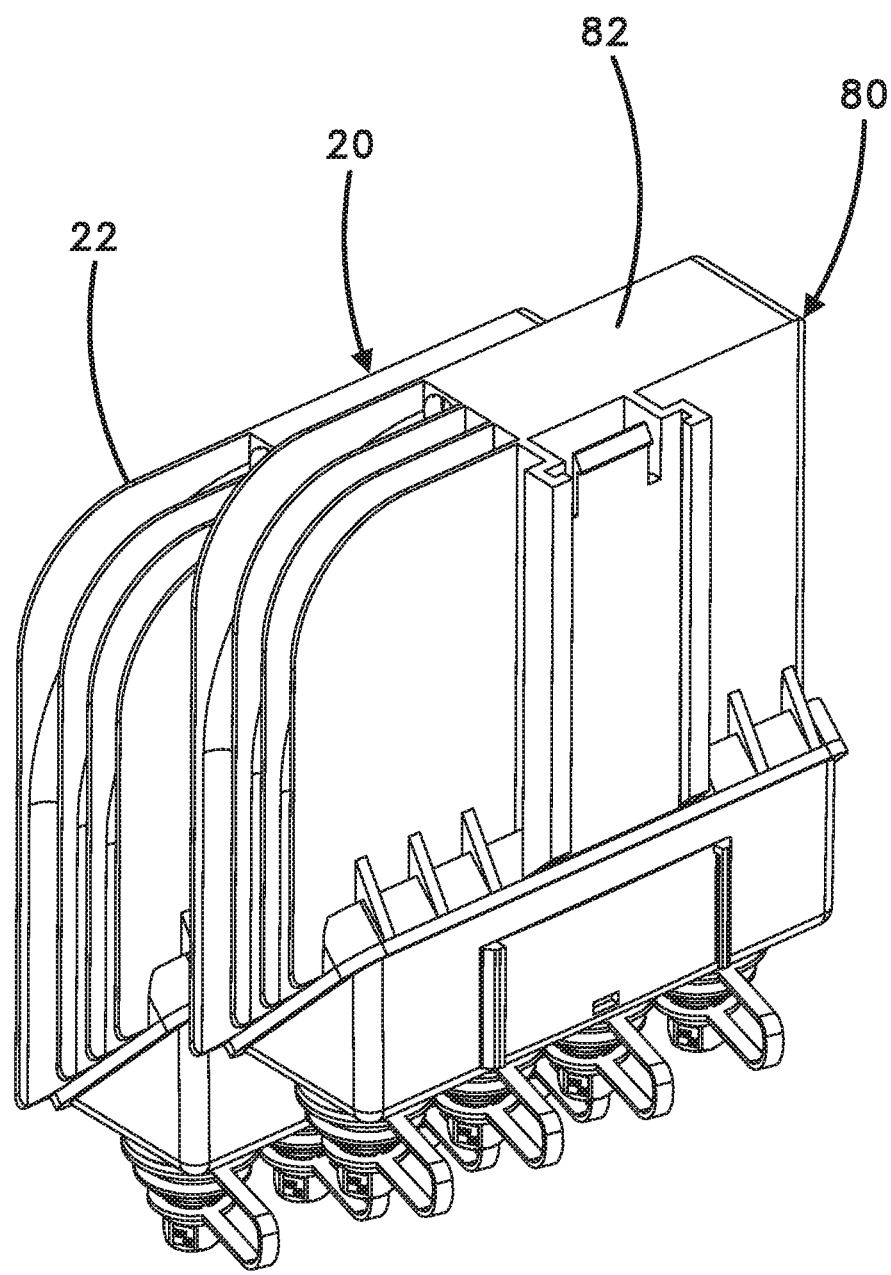
FIG. 14 is a perspective view showing the telecommunications enclosure and the expansion enclosure of FIG. 13 mechanically coupled together.
Figure 18:
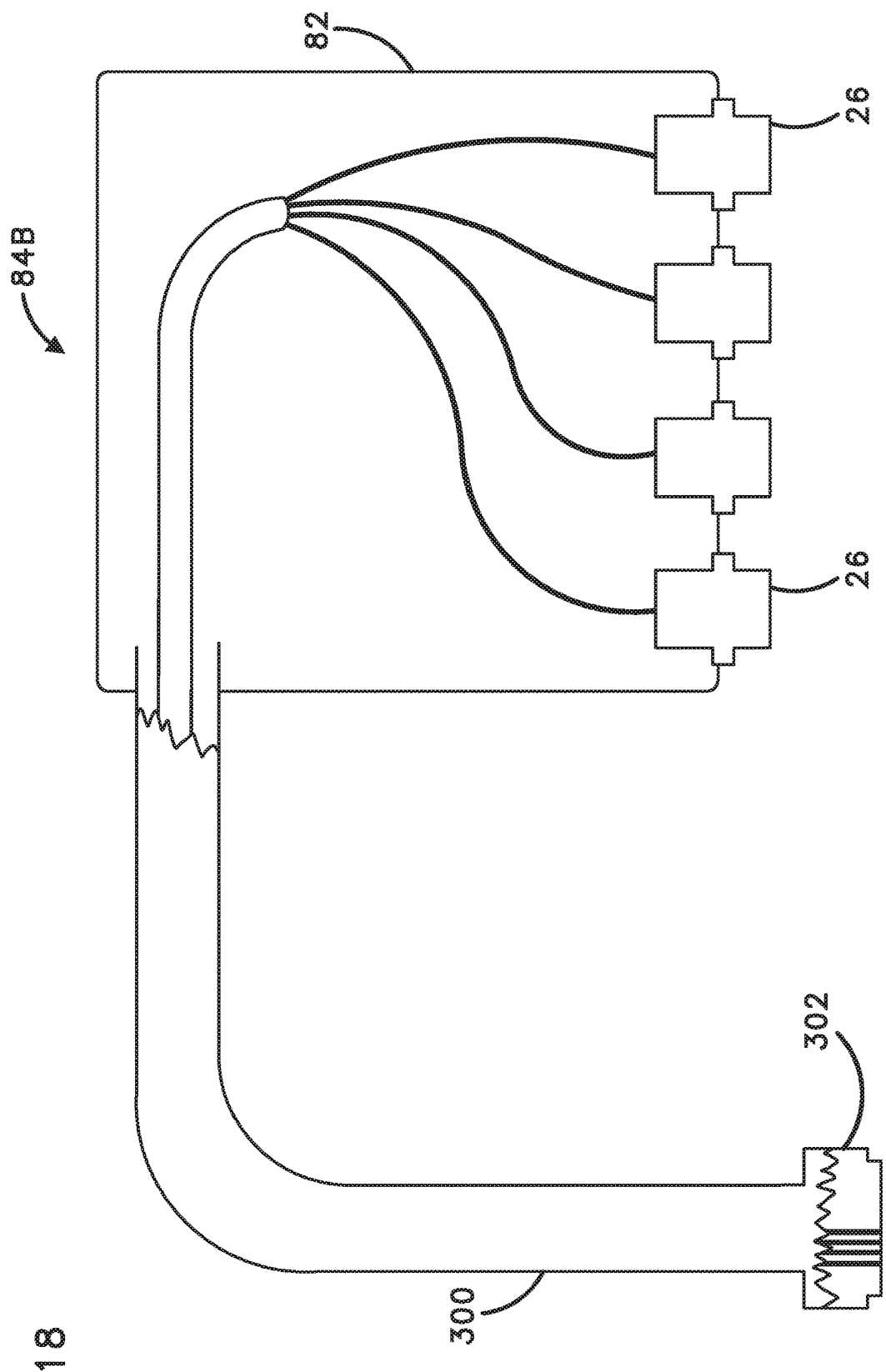
FIG. 18 is a schematic view showing an example expansion enclosure suitable for use with the telecommunications enclosure of FIG. 17.

FIG. 18 schematically depicts an example expansion enclosure 84b that can have mechanical features of the type shown by the second fiber optic enclosure 84 of FIG. 13. The expansion module 84b includes a stub cable 300 having a free end terminated by a multi-fiber fiber optic connector 302. In the depicted example, the multi-fiber fiber optic connector 302 has a plurality of fiber positions that preferably correspond with the fiber positions of the fiber optic connectors 48, 50 of the communications enclosure 20b. It is preferred for the fiber optic connector 302 to be matable with either of the fiber optic connectors 48, 50 to allow the fiber optic expansion enclosure 84b to be optically connected to a network through the telecommunications enclosure 20b. The expansion enclosure 84b includes a plurality of fiber optic adapters 26 coupled to optical fibers corresponding to the fiber positions of the fiber optic connector 302. By mounting the housing of the expansion enclosure 80b on the housing of the telecommunications enclosure 20b, and by coupling the fiber optic connector 302 to one of the fiber optic connectors 48, 50 of one of the stub cables 40, 42, the fiber optic capacity at the telecommunications enclosure 20b can be expanded. In certain examples, two of the expansion enclosures 84b can be coupled to the housing 22 of the telecommunications enclosure 20b with each of the expansion enclosures coupled to one of the first or second stub cables 40, 42 to provide optical connectivity to the expansion enclosures.

Figure 19:
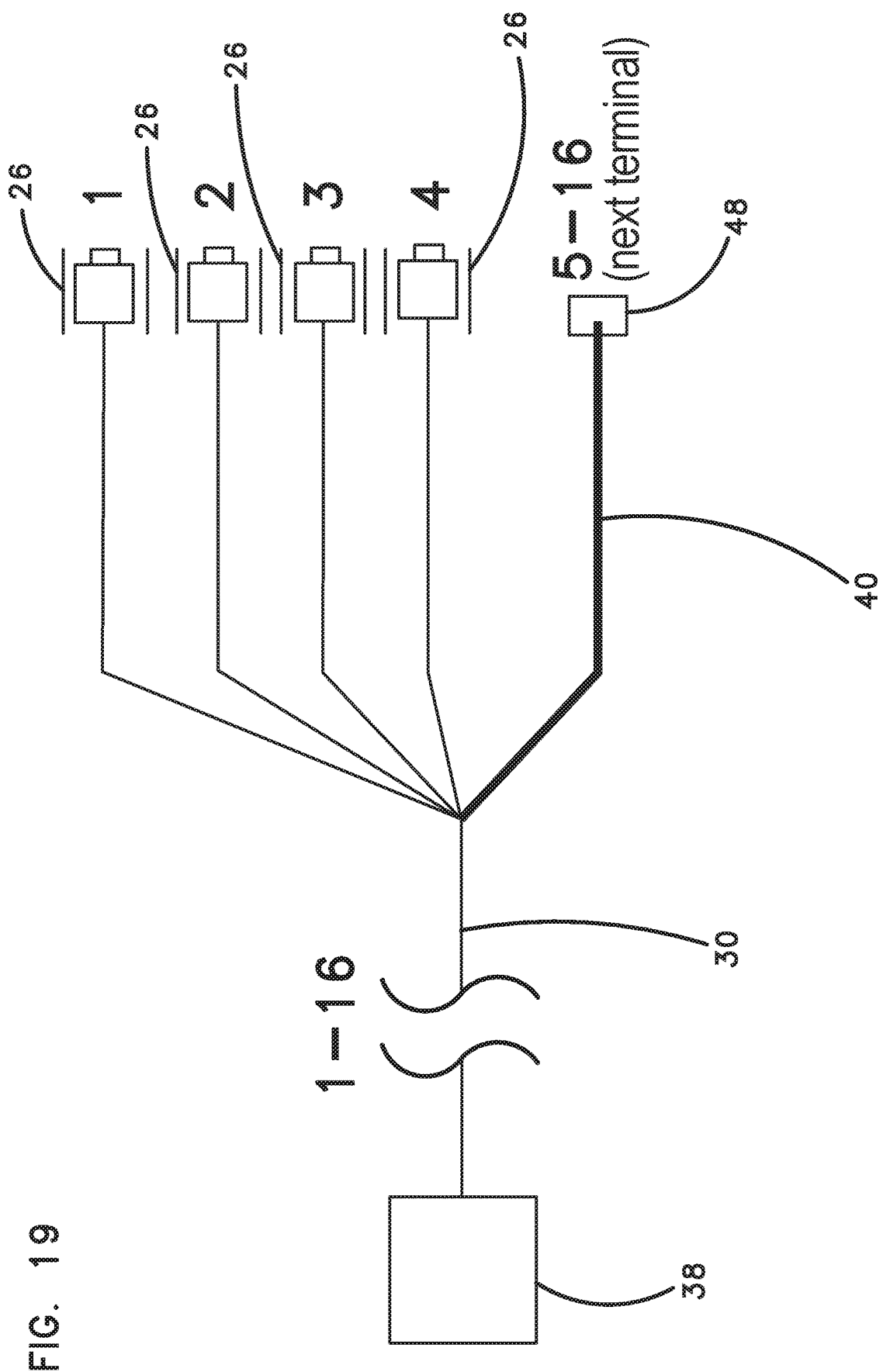
FIG. 19 illustrates still another fiber optic architecture that can be incorporated as part of the telecommunications enclosure of FIG. 1.

FIG. 19 shows another architecture that can be used with the telecommunications enclosure 20. In the depicted architecture of FIG. 19, only the first fiber optic stub cable 40 is used. In this example, the second fiber optic stub cable 42 is absent. The fiber optic input cable 30 is shown including sixteen optical fibers. Four of the optical fibers are coupled to the fiber optic adapters 26, while the remaining optical fibers are typically coupled to the first fiber optic stub cable 40. Thus, the first fiber optic stub cable 40 provides means for coupling to a subsequent terminal.

It will be appreciated that different embodiments of the present disclosure can have different fiber counts and different split ratios. For example, while the telecommunications enclosures depicted herein we have been shown with four fiber optic adapters, alternative enclosures may include eight, twelve, sixteen or more fiber optic adapters 26. Additionally, while passive optical splitters shown herein have been shown as 1:4 optical splitters, other split ratios could also be used. For example, other split ratios can include 1:2, 1:8, 1:16, 1:32, 1:64 or other split ratios. The use of higher split ratios can be another means for providing more adapter ports at a given telecommunications enclosure.

One aspect of the present disclosure relates to an enclosure including a housing having a first location at which a plurality of ruggedized fiber optic adapters are positioned; and/or a second location remote or separate from the first location which includes a cable entrance/exit location; and/or the first and second locations are on opposite sides of the housing; and/or a cable passing through the entrance/exit location extends along a first orientation that is angled (e.g., perpendicular) relative to axes of the ruggedized fiber optic adapters; and/or the housing includes an external cable management feature for guiding a cable between the second and first locations; and/or the housing includes at least one channel that extends at least partially between the first and second locations; and/or wherein the housing includes an external cable bend radius limiting structure for guiding a cable routed on a path that extends between the first and second locations; and/or the enclosure has an indexing architecture; and/or the housing has a mechanical interface for attaching an expansion housing to the housing; and/or an input cable having one or more optical fibers is routed through the cable entrance/exit location; and/or an output stub cable having one or more optical fibers is routed through the cable entrance/exit location; and/or the cable entrance/exit location is sealed; and/or one or more of the cables includes a free end with a ruggedized de-mateable optical connection location; and/or the stub cable is less than or equal to one meter in length; and/or the enclosure includes a fiber indexing architecture; and/or the enclosure includes an expansion architecture; and/or the enclosure includes a passive optical splitter or wavelength divisional multiplexing device within the housing; and/or the enclosure includes a fan-out within the housing.

What is claimed is:

1. A telecommunications enclosure comprising:
   a housing defining an interior, the housing including a first side;
   a plurality of fiber optic adapters positioned at the first side of the housing, the fiber optic adapters having ruggedized outer ports fixed relative to the first side of the housing and accessible from outside the housing at the first side of the housing;
   a fiber optic cable that enters the interior of the housing at a cable entrance/exit location that is not located at the first side, the fiber optic cable being routed along a path extending along an exterior of the housing from the cable entrance/exit location to the first side;
   wherein the fiber optic cable includes a fiber optic input cable having at least one optical fiber coupled to at least one ruggedized first de-mateable optical connection location corresponding to at least one of the fiber optic adapters; and
   an output stub cable having one or more optical fibers and having a free end positioned outside the housing that is connectorized by a hardened fiber optic connector, the output stub cable entering the interior of the housing at a cable entrance/exit location and being routed along the path extending along an exterior of the housing from the cable entrance/exit location to the first side such that the free end of the output stub cable is accessible at the first side of the housing.

2. The telecommunications enclosure of claim 1, wherein the exterior of the housing defines a channel for receiving the fiber optic cable that extends along at least a portion of the path.

3. The telecommunications enclosure of claim 1, wherein the path extends around a corner of the housing.

4. The telecommunications enclosure of claim 3, wherein the corner includes a curved cable bend radius limiting surface.

5. The telecommunications enclosure of claim 4, wherein the channel extends around the corner.

6. The telecommunications enclosure of claim 1, wherein the housing includes a second side opposite the first side, and wherein the cable entrance/exit location is located at the second side.

7. The telecommunications enclosure of claim 6, wherein a first dimension extends between the first and second side, wherein the fiber optic cable extends along a second dimension at the cable entrance location, and wherein the first and second dimensions are perpendicular relative to one another.

8. The telecommunications enclosure of claim 6, wherein the housing includes third and fourth opposite sides that extend between the first and second sides, and fifth and sixth opposite sides that extend between the first and second sides and that also extend between the third and fourth sides.

9. The telecommunications enclosure of claim 8, wherein the first side is a bottom side, the second side is a top side, the third side is one of a left or right side, the fourth side is the other of the left or right sides, the fifth side is a front side and the sixth side is a rear side, and wherein the front and rear sides are major sides of the housing.

10. The telecommunications enclosure of claim 9, wherein the path extends from the second side around a rounded corner to the third side, and then extends from the rounded corner along the third side to adjacent the first side.

11. The telecommunications enclosure of claim 1, wherein the fiber optic input cable includes a plurality of optical fibers coupled to ruggedized first de-mateable optical connection locations corresponding to the fiber optic adapters.

12. The telecommunications enclosure of claim 1, wherein the fiber optic cable is an output stub cable having one or more optical fibers and having a free end positioned outside the housing that is connectorized by a hardened fiber optic connector.

13. The telecommunications enclosure of claim 12, wherein the output stub cable has a length less than or equal to one meter.

14. The telecommunications enclosure of claim 1, wherein the path extends around a corner of the housing, and wherein the housing includes separate parallel channels that extend along at least a portion of the path for respectively receiving the output stub cable and the fiber optic input cable.

15. The telecommunications enclosure of claim 1, wherein the telecommunications enclosure is a first telecommunications enclosure, and wherein the housing of the first telecommunications enclosure includes a mechanical coupling interface for attaching a housing of a second telecommunications enclosure to the housing of the first enclosure, wherein the second telecommunications enclosure includes a fiber optic stub cable that couples to the output stub cable of the first telecommunications enclosure.

16. A telecommunications enclosure comprising:
   a housing defining an interior, the housing including a first side;
   a plurality of fiber optic adapters positioned at the first side of the housing, the fiber optic adapters having ruggedized outer ports fixed relative to the first side of the housing and accessible from outside the housing at the first side of the housing;

an input cable including one or more optical fibers optically coupled to ruggedized first de-mateable optical connection locations at the fiber optic adapters, wherein drop cables can be optically coupled to the one or more optical fibers via ruggedized fiber optic connectors mated with the ruggedized outer ports; and a stub cable that enters the housing at a location other than the first side, the stub cable having a free end including a ruggedized second de-mateable optical connection location coupled to at least one of the one or more optical fibers of the input cable, the second de-mateable optical connection location being accessible at the first side of the housing.

\* \* \* \* \*